(12) United States Patent
Gryshchenko et al.

(10) Patent No.: US 11,079,475 B2
(45) Date of Patent: Aug. 3, 2021

(54) OPTICAL DEVICE AND DEPTH INFORMATION GENERATING METHOD

(71) Applicant: Samsung Electronics Co., Ltd., Suwon-si (KR)

(72) Inventors: Sergii Gryshchenko, Kharkov (UA); Iegor Vdovychenko, Kharkov (UA); Ivan Safonov, Kharkov (UA); Andrii But, Kharkov (UA); Vitaliy Bulygin, Kharkov (UA); Volodymyr Khristyan, Myrgorod (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 15/579,375

(22) PCT Filed: Feb. 24, 2016

(86) PCT No.: PCT/KR2016/001821
§ 371 (c)(1),
(2) Date: Dec. 4, 2017

(87) PCT Pub. No.: WO2016/200013
PCT Pub. Date: Dec. 15, 2016

(65) Prior Publication Data
US 2018/0157155 A1    Jun. 7, 2018

(30) Foreign Application Priority Data
Jun. 8, 2015 (KR) .................. 10-2015-0080551

(51) Int. Cl.
*G03B 21/20*    (2006.01)
*G03B 21/28*    (2006.01)
(Continued)

(52) U.S. Cl.
CPC ............ *G01S 7/4815* (2013.01); *G01S 17/42* (2013.01); *G01S 17/48* (2013.01); *G01S 17/894* (2020.01);
(Continued)

(58) Field of Classification Search
CPC .. G03B 21/008; G03B 21/2033; G03B 21/28; G01S 17/894; G01S 17/42; G01S 17/48;
(Continued)

(56) References Cited

U.S. PATENT DOCUMENTS 6,144,366 A    11/2000 Numazaki et al.
6,498,581 B1    12/2002 Yu
(Continued)

FOREIGN PATENT DOCUMENTS

EP    2 711 667 A1    3/2014
JP    2013-093847 A    5/2013
(Continued)

OTHER PUBLICATIONS

Blais F et al., "Range Error Analysis of an Integrated Time of Flight, Triangulation, and Photogrammetric 3D Laser Scanning System", Visual Communications and Image Processing, vol. 4035, Apr. 24, 2000, pp. 236-247, XP003009183, San Jose.
(Continued)

*Primary Examiner* — Brandi N Thomas
(74) *Attorney, Agent, or Firm* — Jefferson IP Law, LLP

(57) ABSTRACT

An optical device is disclosed. An optical device of the present invention that generates a depth map for an object comprises: a projector for irradiating electromagnetic waves onto an object; an optical receiver for receiving reflected waves reflected from the object; and a processor for generating a first depth map for the object on the basis of the direction of arrival of the received reflected waves, generating a second depth map for the object on the basis of the
(Continued)

arrival time of the received reflected waves, and combining the first depth map and the second depth map and generating a depth map for the object.

16 Claims, 27 Drawing Sheets

(51) Int. Cl.
*G01S 7/481* (2006.01)
*G01S 17/48* (2006.01)
*G01S 17/42* (2006.01)
*G01S 17/894* (2020.01)
*G03B 21/00* (2006.01)
*G06K 9/00* (2006.01)

(52) U.S. Cl.
CPC ....... *G03B 21/008* (2013.01); *G03B 21/2033* (2013.01); *G03B 21/28* (2013.01); *G06K 9/00355* (2013.01)

(58) Field of Classification Search
CPC ........ G01S 17/88; G01S 17/89; G01S 7/4815; G01S 7/497; G01S 17/36; G01S 17/87; G01S 17/08; G01S 17/86; G01S 7/4863; G01S 17/04; G01S 17/50; G01S 7/4808; G01S 7/4911; G01S 17/10; G01S 17/46; G01S 7/4817; G01S 7/4865; G01S 3/7864; G01S 7/4816; G01S 7/486; G01S 7/4866; G01S 7/4915; G01S 11/12; G01S 17/003; G01S 17/32; G01S 17/58; G01S 17/66; G01S 17/931; G01S 1/70; G01S 2007/4975; G01S 2201/01; G01S 5/16; G01S 7/4876; G01S 7/493
USPC ................ 359/290–292, 295, 298, 237, 242, 359/265–267
See application file for complete search history.

(56) References Cited

U.S. PATENT DOCUMENTS

| | | | |
|---|---|---|---|
| 7,430,312 B2 | 9/2008 | Gu | |
| 7,486,591 B2 | 2/2009 | Rooney, III et al. | |
| 8,553,972 B2 | 10/2013 | Kim et al. | |
| 8,611,610 B2 | 12/2013 | Park et al. | |
| 8,711,206 B2 | 4/2014 | Newcombe et al. | |
| 9,418,425 B2 | 8/2016 | Park et al. | |
| 2008/0043574 A1 | 2/2008 | Rooney, III et al. | |
| 2011/0176709 A1 | 7/2011 | Park et al. | |
| 2013/0088726 A1 | 4/2013 | Goyal et al. | |
| 2013/0101176 A1 | 4/2013 | Park et al. | |
| 2013/0182077 A1 | 7/2013 | Holz | |
| 2014/0285623 A1* | 9/2014 | Bruls | G06T 5/002 348/43 |
| 2015/0010049 A1 | 1/2015 | Zhang | |
| 2015/0116460 A1* | 4/2015 | Jouet | H04N 13/271 348/46 |
| 2017/0150067 A1* | 5/2017 | Han | H04N 5/23296 |

FOREIGN PATENT DOCUMENTS

| | | |
|---|---|---|
| JP | 2014-143690 A | 8/2014 |
| KR | 10-2008-0049817 A | 6/2008 |
| KR | 10-2011-0004267 A | 1/2011 |
| KR | 10-2011-0085785 A | 7/2011 |
| KR | 10-2014-0000315 A | 1/2014 |
| KR | 10-2014-0012586 A | 2/2014 |
| KR | 10-2014-0092536 A | 7/2014 |
| KR | 10-2015-0006362 A | 1/2015 |
| WO | 2009/063472 A1 | 5/2009 |
| WO | 2010/068499 A1 | 6/2010 |
| WO | 2012/101582 A1 | 8/2012 |

OTHER PUBLICATIONS

Cheng Chen et al., A new super-resolution 3D-SAR imaging method based on MUSIC algorithm, 2011 IEEE.

J. Barabell, Improving the resolution performance of eigenstructure-based direction-finding algorithms, Dept. of Electrical Engineering and Computer Science Massachusetts Institute of Technology and M.I.T. Lincoln Laboratory, 1983 IEEE, ICASSP 83, Boston.

Cherian P. Mathews et al., Eigenstructure techniques for 2-D angle estimation with uniform circular arrays, IEEE Transactions on Signal Processing, Sep. 1994, vol. 42, No. 9.

Ralph O. Schmidt, Multiple emitter location and signal parameter estimation, IEEE Transactions on Antennas and Propagation, Mar. 1986, vol. AP-34, No. 3.

Ahmed Kirmani et al., Exploiting sparsity in time-of-flight range acquisition using a single time-resolved sensor, Research Laboratory of Electronics, Massachusetts Institute of Technology, Oct. 24, 2011, vol. 19, No. 22, Optical Express 21485.

Ahmed Kirmani et al., CODAC: A compressive depth acquisition camera framework, Research Laboratory of Electronics Massachusetts Institute of Technology, 2012 IEEE, ICASSP 2012.

J. Capon, High Resolution Frequency Wave Number Spectrum Analysis, Processing of the IEEE, Aug. 1969, vol. 57, No. 8.

Lal C. Godara, Applications of Antenna Arrays to Mobile Communications, Part II: Beam-Forming and Direction-of-Arrival Considerations, Processing of the IEEE, Aug. 1997, vol. 85, No. 8.

George V. Serebryakov, Direction-of-Arrival Estimation of Correlated Sources by Adaptive Beamformaing, IEEE Transactions on Signal Processing, November , vol. 43, No. 11.

Tie-Jun Shan et al., On Spatial Smoothing for Direction-of-Arrival Estimation of Coherent Signals, IEEE Transaction on Acoustics, Speech, and Signal Processing, Aug. 1985, vol. ASSP-33, No. 4.

YouTube, Matterform 3D Scanner Unveiled at CES 2014, http://www.youtube.com/watch?v=HbpZAHMGa4w.

YouTube, Hands-on with the Structure Sensor iPad-mounted 3D Scanner (CES 2014), http://www.youtube.com/watch?v=9JOhPHDeRkU.

YouTube, Chips take backseat to a motion sensing 3D camera at Intel's CES event, http://arstechnica.com/gadgets/2014/01/chips-take-backseat-to-a-motion-sensing-3d-camera-at-intels-ces-event/.

Korean Notice of Allowance with English translation dated Mar. 23, 2020; Korean Appln. No. 10-2015-0080551.

* cited by examiner

OPTICAL DEVICE AND DEPTH INFORMATION GENERATING METHOD

TECHNICAL FIELD

The present disclosure relates to an optical device and a depth information generating method using the same, and more particularly, to an optical device for generating a high-resolution depth map by combining a plurality of depth maps generated according to a plurality of wave measuring methods, and a depth information generating method.

BACKGROUND ART

Technique for measuring the depth/distance of a three-dimensional object can be classified into a contact type measuring method that uses a probe, and a non-contact type three-dimensional depth measuring method that uses an optical system. The present disclosure relates to an improved optical system for generating a three-dimensional depth map of an object.

Conventionally, the optical measuring method for use in a measuring device requires a high manufacturing cost for implementation thereof to use precision impulse laser. Another type of conventional method has a space limit because it requires that the light source of the light to be irradiated be distributed over a large area and that a screen for forming a shadow be disposed. Yet another conventional method has a difficulty of performing real-time calculation, because the operation for processing a plurality of obtained frames as a depth map is very complicated. Yet another conventional method using two or more stereo cameras has a drawback of computational complexity for generating two or more three-dimensional models, and need to precisely adjust the position and photographing direction of the two or more cameras. In addition, in most cases, there is a drawback that the device is vulnerable to noise, which makes it difficult to acquire depth information when the device is placed in an environment such as outdoors where there is noise.

DETAILED DESCRIPTION OF THE DISCLOSURE

Technical Problem

An object of the present disclosure is to provide an optical device for generating a high-resolution depth map by combining three-dimensional information of objects generated by a plurality of wave measuring methods and depth information generating method.

Technical Solution

In order to achieve the objects mentioned above, according to an embodiment of the present disclosure, there is provided a depth information generating method for generating a depth map for an object, which may include irradiating an electromagnetic wave onto the object, receiving a reflected wave reflected from the object through an optical receiver, and generating a first depth map for the object based on a direction of arrival of the received reflected wave, generating a second depth map for the object based on a time of arrival of the received reflected wave, and generating a depth map combining the first depth map and the second depth map.

In this example, the generating may include generating the first depth map from a direction of arrival spectrum calculated by performing a correlation operation on a steering vector calculated based on an impulse response of the optical receiver and an output vector of the optical receiver receiving the reflected wave.

In this example, the optical receiver may include a plurality of light receiving elements, and the generating comprises performing the correlation operation using an equation below:

$$P^l(\theta, \phi) = (\vec{x}(t), \vec{a}(\theta, \phi, t, d_l))_2 = \sum_{m=0}^{M-1} (x_m(t) \cdot a_m(\theta, \phi, t, d_l))_2$$

where, M is a total number of the plurality of light receiving elements, $\vec{x}(t)$ is the output vector, $\vec{a}(t, \theta, \varphi, d)$ is the steering vector, $x_m(t)$ is output of an m-th light receiving element, and $a_m(\theta, \phi, t, d_l)$ is a steering vector component corresponding the m-th light receiving element.

In this example, the optical receiver may be an antenna array in which a plurality of light receiving elements are arranged in an equidistant lattice pattern.

Meanwhile, the generating may include calculating a direction of arrival spectrum from which sidelobes have been removed by performing the correlation operation using an equation below and generating the first depth map from the direction of arrival spectrum from which the sidelobes have been removed, $$P^l(\theta, \phi) = \begin{bmatrix} \sum_{m=0}^{M-1} \langle x_m, a_m \rangle, & \text{if } \forall m \langle x_m, a_m \rangle \neq 0 \\ 0, & \text{otherwise} \end{bmatrix}$$

where, $\langle x_m, a_m \rangle$ is $$\langle x_m, a_m \rangle = \begin{bmatrix} \frac{1}{M}, & \text{if } \frac{(x_m, a_m)}{\|x_m\| \cdot \|a_m\|} > \varepsilon, \varepsilon \in (0, 1) \\ 0, & \text{otherwise} \end{bmatrix},$$

where, $(x_m, a_m)$ is $$(x_m, a_m) = \int_{\frac{(\vec{k}, \vec{r}_m)}{c}}^{\frac{(\vec{k}, \vec{r}_m) + \Delta}{c}} x_m(t) \cdot a_m(\theta, \phi, t, d_l) dt$$

where, M is a number of the plurality of light receiving elements, $\vec{k}$ is a wave vector representing the reflected wave incident on the optical receiver, $\vec{r}_m$ is a radius vector representing an m-th light receiving element among the plurality of light receiving elements, $\Delta$ is the wavelength of the reflected wave, and c is the speed of light.

Meanwhile, the depth information generating method may further include irradiating an omnidirectional electromagnetic wave to a monitoring zone comprising the object, receiving some of signals of the omnidirectional electromagnetic wave scattered by the object, and analyzing the received scattered signal and identifying a position of the object, in which the irradiating an electromagnetic wave onto the object may include irradiating the electromagnetic wave onto the object based on the position of the identified object.

In this example, the irradiating an electromagnetic wave onto the object may include analyzing the received scattered signal to calculate a distance between a position at which the electromagnetic wave is irradiated and a nearest point of the object and a farthest point of the object, and irradiating the electromagnetic wave with a varying intensity according to the calculated distance.

Meanwhile, when the number of the objects is plural, the irradiating an electromagnetic wave onto the object may include irradiating the electromagnetic wave onto each of the plurality of objects based on the identified positions of the objects.

Meanwhile, the electromagnetic wave irradiated onto the object may be time and spatial light modulated electromagnetic wave.

In this example, the depth information providing method may further include time light modulating an electromagnetic wave radiated from a light source, spatial light modulating the time light modulated electromagnetic wave using a plurality of binary patterns changed according to time, and generating the time and spatial light modulated electromagnetic wave.

Meanwhile, the object may be a user's hand, and the method may further include controlling a function of a display device that outputs an image according to a gesture command corresponding to a movement of the hand determined from the combined depth map.

Meanwhile, the optical receiver may be an antenna array in which a plurality of light receiving elements are arranged in one or a plurality of concentric circles.

Meanwhile, the generating a depth map may include combining the first depth map and the second depth map using super resolution technique or hybrid imaging technique.

Meanwhile, the irradiating an electromagnetic wave onto the object may include irradiating onto the object while shifting the electromagnetic wave composed of a plurality of laser beams to a preset direction, thereby irradiating the electromagnetic wave over the entire object.

Meanwhile, an optical device for generating a depth map for an object according to an embodiment is provided, which may include a projector for irradiating an electromagnetic wave onto the object, an optical receiver for receiving the reflected wave reflected from the object, a processor for generating a first depth map for the object based on a direction of arrival of the received reflected wave, generating a second depth map for the object based on a time of arrival of the received reflected wave, and generating a depth map for the object by combining the first depth maps and the second depth maps.

In this example, the processor may generate the first depth map from a direction of arrival spectrum calculated by performing a correlation operation on a steering vector calculated based on an impulse response of the optical receiver and an output vector of the optical receiver receiving the reflected wave.

In this example, the optical receiver may include a plurality of light receiving elements, and the processor may perform the correlation operation using an equation below:

$$P^l(\theta, \phi) = (\vec{x}(t), \vec{a}(\theta, \phi, t, d_l))_2 = \sum_{m=0}^{M-1} (x_m(t) \cdot a_m(\theta, \phi, t, d_l))_2$$

where, M is a total number of the plurality of light receiving elements, $\vec{x}(t)$ is the output vector, $\vec{a}(t, \theta, \varphi, d)$ is the steering vector, $x_m(t)$ is output of an m-th light receiving element, and $a_m(\theta, \varphi, t, d_l)$ is a steering vector component corresponding the m-th light receiving element.

In this example, the optical receiver may be an antenna array in which a plurality of light receiving elements are arranged in an equidistant lattice pattern.

Meanwhile, the processor may perform the correlation operation using an equation below, calculate a direction of arrival spectrum from which sidelobes have been removed by performing the correlation operation using an equation below and generate the first depth map from the direction of arrival spectrum from which the sidelobes have been removed:

$$P^l(\theta, \phi) = \begin{bmatrix} \sum_{m=0}^{M-1} \langle x_m, a_m \rangle, & \text{if } \forall m \langle x_m, a_m \rangle \neq 0 \\ 0, & \text{otherwise} \end{bmatrix}$$

where, $\langle x_m, a_m \rangle$ is $$\langle x_m, a_m \rangle = \begin{bmatrix} \frac{1}{M}, & \text{if } \frac{(x_m, a_m)}{\|x_m\| \cdot \|a_m\|} > \varepsilon, \varepsilon \in (0, 1) \\ 0, & \text{otherwise} \end{bmatrix},$$

where, $(x_m, a_m)$ is $$(x_m, a_m) = \int_{\frac{(\vec{k}, \vec{r}_m)}{c}}^{\frac{(\vec{k}, \vec{r}_m) + \Delta}{c}} x_m(t) \cdot a_m(\theta, \phi, t, d_l) dt$$

where, M is a number of the plurality of light receiving elements, $\vec{k}$ is a wave vector representing the reflected wave incident on the optical receiver, $\vec{r}_m$ is a radius vector representing an m-th light receiving element among the plurality of light receiving elements, $\Delta$ is the wavelength of the reflected wave, and c is the speed of light.

Meanwhile, the projector may irradiate an omnidirectional electromagnetic wave to a monitoring zone containing the object, and the optical receiver may receive some of the signals of the omnidirectional electromagnetic wave scattered by the object, and the processor may analyze the received scattered signals to identify the position of the object, and irradiate the electromagnetic wave onto the object based on the identified position of the object.

In this example, the processor may analyze the received scattered signal to calculate a distance to a nearest point of the object and a farthest point of the object from a position where the electromagnetic wave is irradiated, and may control the projector to irradiate the electromagnetic wave with a varying intensity according to the calculated distance.

In this example, when there are a plurality of objects, the processor may control the projector to irradiate the electromagnetic wave to each of the plurality of objects based on the position of the identified object.

Meanwhile, the projector may irradiate time and spatial light modulated electromagnetic wave the object.

In this example, the projector may include a light source for emitting the electromagnetic wave and a spatial light modulator (SLM) for spatial modulating the radiated electromagnetic wave.

In this example, the processor may perform time light modulation of electromagnetic wave radiated from the light source, and transmit a signal for a plurality of binary patterns varying according to time to the SLM to perform spatial light modulation of the time light modulated electromagnetic wave.

Meanwhile, the object may be a user's hand, and the processor may control a function of a display device that outputs an image according to a gesture command corresponding to the motion of the hand determined from the combined depth map.

Meanwhile, the optical receiver may be an antenna array in which a plurality of light receiving elements are arranged in one or a plurality of concentric circles.

Meanwhile, the processor may combine the first depth map and the second depth map using a super resolution technique or a hybrid imaging technique.

Meanwhile, the projector may irradiate the electromagnetic wave composed of a plurality of laser beams, and the processor may control the projector to irradiate onto the object while shifting the plurality of laser beams in a preset direction, thereby irradiating the electromagnetic wave over the entire object.

Advantageous Effects

The conventional ToF camera is able to generate only a depth map for a narrow area due to its small aperture, but the present disclosure is capable of generating a depth map for the entire area in a space of 180 degrees in front where an optical receiver receives light, as long as the optical receiver is exposed to the outside.

In addition, unlike the classic DoA method for computing the arrival angle, the DoA method proposed by the present disclosure can compute distances to a plurality of points.

BEST MODE

Hereinafter, embodiments of the present disclosure will be described in detail with reference to the accompanying drawings. In the below description of the present disclosure, a detailed description of known functions and configurations incorporated herein will be omitted when it may make the subject matter of the present disclosure rather unclear. In addition, terminologies used herein are terms used to properly represent preferred embodiments of the present disclosure, which may vary depending on the user, the intention of the operator, or the practice of the field to which the present disclosure belongs. Therefore, the definitions of these terms should be based on the contents throughout the description.

Figure 1:
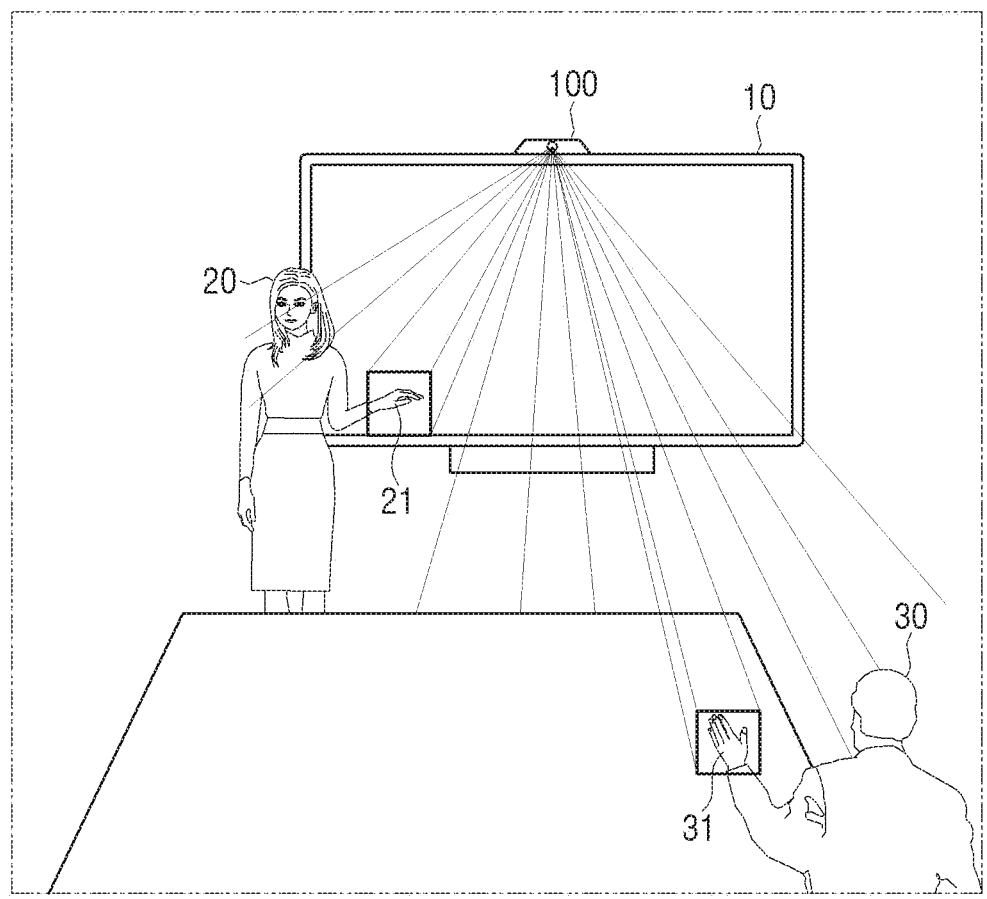
FIG. 1 is a view showing a display system using an optical device according to an embodiment of the present disclosure.

FIG. 1 is a view showing a display system using an optical device according to an embodiment of the present disclosure.

Referring to FIG. 1, the display system includes an optical device 100 for recognizing a user's gesture and a display device 10 for displaying an image.

The display device 10 displays an image. An image displayed by the display device 10 may be an image of data received from an external device, a removable storage, and so on connected via a communication interface. In addition, the image may be an image of data stored in an internal storage of the display device 10. Further, the display device 10 may display an over-the-air broadcast received through a wireless antenna, or an image streamed or downloaded in a wired manner.

The display device 10 may be implemented as various display units such as liquid crystal display (LCD) panel, plasma display panel (PDP), organic light emitting diode (OLED), vacuum fluorescent display (VFD), field emission display (FED), and electro luminescence display (ELD).

Meanwhile, the display device 10 may be implemented as a general display panel having no touch input function, or may be implemented as a touch display panel capable of recognizing a manipulation of a user who is using a proximity sensor or a touch sensor. When implemented as a touch display panel, the display device 10 may be inputted with at least one touch gesture via a user's body (e.g., finger including a thumb) or a sensible input means (e.g., stylus pen). In addition, the display device 10 may include a microphone for recognizing the user's voice, and perform as commanded by the user's voice. In addition, the display device 10 may receive a radio signal from the remote control device and perform a function corresponding to a command of a user inputted from a remote distance.

A plurality of users 20, 30 may control the display device 10 within a range recognizable by the optical device 100 by making a preset hand movement or hand shape.

For example, the user 20 may make an action 21 corresponding to a preset hand movement (or, interchangeably, a gesture) that causes the display device 10 to display the next slide. At the same time, the user 30 may make a hand shape corresponding to a preset shape for adjusting the volume of sound outputted from the display device 10.

The optical device 100 identifies one or a plurality of hands. Specifically, the optical device 100 may irradiate electromagnetic wave to a monitoring zone in front, receive the reflected waves, and identify the hands 21, 31 from the signals of the received reflected waves.

In addition, the optical device 100 generates a depth map for the identified hands 21, 31. Specifically, the optical device 100 may irradiate electromagnetic wave to positions of the identified hands 21, 31 to generate a depth map that can express a 3D hand shape.

The optical device 100 may determine whether the generated depth map of respective hands 21, 31 corresponds to a preset hand movement or hand shape, and output a control command corresponding to the corresponding hand movement or hand shape to the display device 10.

With the display system of an embodiment described above, a plurality of users at a remote distance can input control commands with only a simple gesture. In various embodiments where the optical device of the present disclosure is utilized, the optical device may be used not only in the display device as described above, but also in a remote medical system to generate a depth map for hands of a doctor who performs a direct treatment on a patient at a remote distance using a robot arm. In addition, the optical device may enable a user to play a video game intuitively and actively. In addition, the optical device may be installed in an ordinary home or office to illuminate an interior space of a room, such that a resident may input a command to control a specific electronic appliance installed indoor with a gesture anywhere as needed.

The control of the display device by hand shape or hand movement has been described above In one example, but the controlled device is not limited thereto. In addition, the body part for control is not limited to the hand only, and it may be anywhere such as shoulder, fingertip, upper body, and so on.

Figure 2:
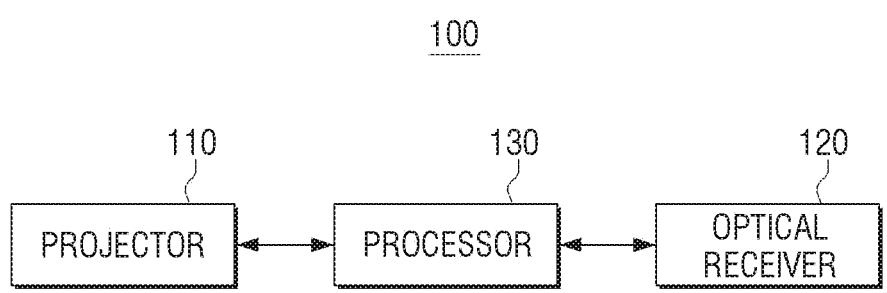
FIG. 2 is a block diagram showing the configuration of an optical device according to an embodiment of the present disclosure.

FIG. 2 is a block diagram showing the configuration of an optical device according to an embodiment of the present disclosure.

Referring to FIG. 2, an optical device 100 includes a projector 110, an optical receiver 120, and a processor 130.

The projector 110 irradiates an electromagnetic wave to an object. Specifically, the projector 110 may radiate electromagnetic wave for sensing the object toward a monitoring zone.

The projector 110 may include a light source that radiate electromagnetic wave. As one example, the projector 110 may include a laser device that radiates a laser beam. Here, the laser device may be implemented as a single laser diode or an array of diodes including a plurality of laser diodes.

In this example, the light source of the projector 110, which radiates electromagnetic wave, may adjust the intensity and/or frequency suitable for the electromagnetic wave propagated to the monitoring zone to be reflected against the object and received.

The projector 110 may adjust the direction of irradiating the electromagnetic wave. Specifically, the projector 110 may shift the position of illuminating the electromagnetic wave—that is, focus—to the monitoring zone. To this end, the projector 110 may be provided with optical equipment in front of the light source. The optical equipment is a steering/aligning device that may change the direction of light. The optical equipment may include one or a plurality of lenses, mirrors, gratings, shutters, and so on.

The projector 110 may emit a plurality of laser beams. Specifically, the projector 110 may radiate the light radiated from one or a plurality of light sources as the laser beams outputted from a plurality of preset positions. In this example, the plurality of preset positions may be in a form such as a lattice having orthogonal alignment.

The projector 110 may irradiate time and spatial light modulated electromagnetic wave. Specifically, the projector 110 may irradiate harmonically vibrating light having a preset sinusoidal form with respect to time. Then, the projector 110 may irradiate a light that varies over time in a preset pattern with respect to space.

In this example, the projector 110 may irradiate spatially modulated electromagnetic wave according to a pre-stored binary pattern. In one embodiment, one laser beam outputted from one laser device and expanded through an expander may then be radiated as a plurality of laser beams by a barrier having a pattern through which the light can pass.

Specifically, the projector 110 may include a spatial light modulator (SLM). The SLM may perform spatial light modulation of the electromagnetic wave radiated by the light source. The SLM modulates the electromagnetic wave by changing a specific region to transparent or opaque state according to an electric signal corresponding to a preset pattern. More specifically, the SLM may include two-dimensional (2D) array pixels. In addition, the SLM may change the transmittance of each pixel according to electric signal. In the present disclosure, a pattern used for spatial light modulation may be a binary pattern. In one embodiment, the SLM may include a micro-mirror array. Various other types of SLMs may be used. For example, an LCD-based SLM, a reflective LCoS SLM that changes the path of the incident light, and an OASLM that modulates light by an optical signal may be used.

The optical receiver 120 receives the reflected wave. Specifically, the optical receiver 120 may receive the reflected wave, which is the electromagnetic wave radiated from the projector 110 and reflected from the object. Hereinbelow, in describing the configuration of the present disclosure, the optical receiver may be referred to simply as a receiver, an optical receiver or an antenna in a sense that it receives wave.

The optical receiver 120 may sense an incoming electromagnetic wave and transform the received light energy into an electrical signal. For this purpose, the optical receiver 120 may include one (single) or a plurality (or array) of light sensing elements ("light receiving element") such as photodiodes or photo transistors. For reference, generally, in implementing the optical device 100, the resolution of the depth map is proportional to the number of sensors of the optical receiver 120 that receive the incident reflected wave.

The optical receiver 120 may be in a form of a uniform rectangular array (URA) in which a plurality of light receiving elements are arranged in a lattice form. In one example, the optical receiver 120 may be an array provided in a form such that a plurality of photodiodes are arranged at equal intervals in the horizontal and vertical directions. In another embodiment, the optical receiver 120 may be a uniform circular array (UCA) in which a plurality of light receiving elements are arranged in a form of one or a plurality of concentric circles. In one example, the optical receiver 120 may be one or a plurality of concentrically-circular arrays having a plurality of photodiodes aligned along a circle at equal intervals.

The processor 130 generates a depth map of an object in the monitoring zone using the electric signal outputted from the optical receiver 120 that received the reflected wave. Specifically, the processor 130 may generate a depth map using an algorithm for acquiring 3D information of an object present in the monitoring zone (or a scene of interest).

The processor 130 may generate a plurality of depth maps using a plurality of different algorithms that generate a depth map from the signals sensed at the optical receiver 120. In addition, the processor 130 may combine a plurality of depth maps to generate a depth map for the object.

Specifically, the processor 130 may generate a first depth map for the object based on the direction of arrival of the received reflected wave, and generate a second depth map for the object based on the time of arrival of the received reflected wave. In one example, the processor 130 may use a direction of arrival (DoA) estimation algorithm and a time of flight (ToF) estimation algorithm to generate a depth map according to the respective algorithms.

In this example, the direction of arrival (DoA) refers to an incident angle at which light reaches the receiver 120 of the optical device 100. When the DoA estimation algorithm is used, the optical device may compute the direction of arrival of the reflected wave reflected from the object and entered into the optical receiver 120.

The processor 130 may generate a depth map of the object according to the DoA method. Specifically, the processor 130 may process the signal according to a DoA estimation method that uses correlation operation between the output of the receiver 120 and the impulse response of the receiver to generate a rough depth map of the object. The DoA estimation algorithm and the computed spectrum thereby will be described in detail below.

The processor 130 may generate a depth map of the object according to the ToF method. In detail, the processor 130 may generate a depth map of the object by processing the signal according to a ToF estimation method, which computes a time during which the spatially modulated light travels a round trip path from being reflected against the object until being received.

The processor 130 combines the plurality of generated depth maps. Specifically, the processor 130 may combine the first depth map generated by the DoA method with the second depth map generated by the ToF method. In order to combine the two depth maps, the processor 130 may use various techniques for generating an image with improved resolution by combining/synthesizing two images data. For example, the processor 130 may be a hybrid imaging technique that combines two or more images having different image characteristics, or a superresolution technique that restores a single high-resolution image using a plurality of low-resolution image information.

The processor 130 may control the projector 110 to irradiate omnidirectional electromagnetic wave. Specifically, the processor 130 may control the projector 110 to irradiate omnidirectional electromagnetic wave over the monitoring zone, rather than pointing to a specific area of the monitoring zone.

In this case, the optical receiver 120 may receive some of the scattered signals as the omnidirectional electromagnetic wave irradiated from the projector 110 is impinged on and scattered from the one or a plurality of objects. In other words, the omnidirectional electromagnetic wave irradiated to the monitoring zone may be reflected against the object and scattered, and some of the scattered signals directed toward the optical receiver 120 may be received at the optical receiver 120.

The processor 130 may analyze the received scattered signal to identify the position of at least one object. The processor 130 may then control the projector 120 to irradiate electromagnetic wave onto the object based on the identified position of the object. Specifically, the processor 130 may control the direction in which the projector 120 is faced such that the direction of propagation of the electromagnetic wave is directed toward the identified position of the object. In this example, when there are a plurality of objects being identified, the processor 130 may control the projector 120 to irradiate electromagnetic wave to each of a plurality of objects based on the identified positions of the objects.

In addition, the processor 130 may analyze the received scattered signal to calculate the distance to a nearest point of the object and a farthest point of the object from a position at which the projector irradiates the electromagnetic wave. In other words, the processor 130 may process the received signal of the scattered reflected light to determine the nearest point of the object and the farthest point of the object. There is a possibility that the laser irradiated by the projector 110 may damage the human body such as skin or eyes depending on frequency or intensity of the laser. In addition, the light receiving element of the optical receiver 120 can typically receive limited light intensities, and if an intense reflected light exceeding the limit is entered, the receiver may be blinded. Thus, it may be necessary for the processor 130 to compute the nearest point and the farthest point on the object to generate the depth map, and control the projector 110 to illuminate only a sufficient amount of light to produce a depth map between the nearest point and the farthest point.

The optical device 100 as described above may generate a 3D high-resolution depth map of an object.

Figure 3:
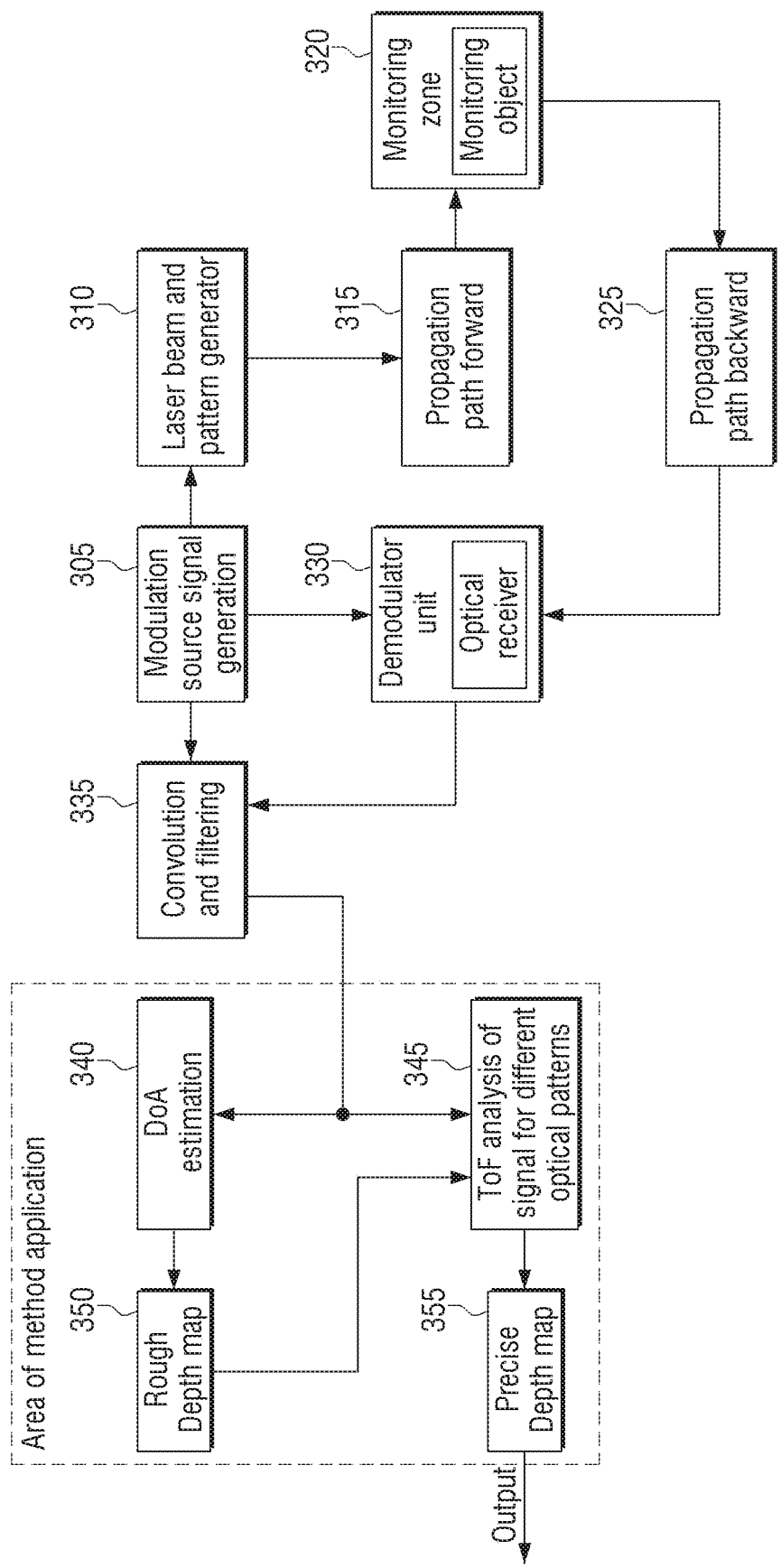
FIG. 3 is a block diagram showing respective blocks for the functions and operations of the configurations of the optical device of FIG. 2.

FIG. 3 is a block diagram showing respective blocks for the functions and operations of the configurations of the optical device of FIG. 2.

Referring to FIG. 3, a plurality of blocks 305 to 355 are shown, each of which being a unit of a specific function and operation of the optical device 100. The blocks of FIG. 3 are intended to facilitate the explanation of the disclosure and are not limited to specific structure.

The modulation source signal generator 305 generates a digitally modulated signal. Specifically, the modulation source signal generator 305 may generate a source signal to be transmitted to the projector 110 for time and spatial modulation of electromagnetic wave. The modulation information generated by the modulation source signal generator 350 may be shared with the demodulator unit 330 and the convolution and filtering module 335 to be used for processing the received signal.

The laser beam and pattern generator 310 generates one or a plurality of laser beams for illuminating the monitoring zone and a pattern of the modulated laser beam. Specifically, the laser beam and pattern generator 310 outputs the laser radiated from the light source of the projector 110 of FIG. 2 as one or a plurality of laser beams having a preset number and a preset shape. In addition, the laser beam and pattern generator 310 transmits or blocks a portion of one or a plurality of laser beams at preset timings so that a patterned laser beam is outputted. In one embodiment, the functions of the laser beam and pattern generator 310 may be implemented with SLM.

The propagation path forward 315 is a block indicating that the modulated electromagnetic wave is propagated toward the monitoring zone.

The monitoring zone 320 includes a monitoring object 321. The monitoring zone 320 is a space within a distance and a range where it can receive the reflected wave when the electromagnetic wave arrived from the optical device 100 of FIG. 2 is reflected. In addition, in the monitoring zone 320, an object 321 as a subject of the depth map is located.

The propagation path backward 325 is a block indicating that the transmitted electromagnetic wave is reflected against the object and returned.

The demodulator unit 330 receives the analog signal of the reflected wave, transforms it into a digital signal, and demodulates the digital signal. The demodulator unit 330 may include an optical receiver 331 to receive the reflected waves. In this example, the optical receiver 331 may be implemented as the optical receiver 120 of FIG. 2. In the process at the demodulator unit 330 of digitizing the electric signal transformed from the optical signal, processes such as filtering, gain, down converting, and so on may be further added.

The convolution and filtering module 335 extracts valid information from the signal received through the optical receiver 331 based on the modulation information shared with the modulation source signal generator 305. Specifically, the convolution and filtering module 335 filters information corresponding to a significant wave among the received waves based on the modulated information of the source signal, and determines whether or not a correct signal is acquired depending on whether the convolution result is positive or not.

A DoA estimation unit 340 processes the raw data outputted from the convolution and filtering module 335 according to the DoA algorithm for generating the direction and depth map of the reflected wave received at the optical receiver 331.

The depth map generated as a result of data processing by the DoA estimating unit 340 is stored as a rough depth map 350 in the storage, and so on.

The ToF signal analysis unit for different optical patterns 345 processes the raw data according to the ToF algorithm for generating the depth map for all the monitoring scenes.

Further, the ToF signal analysis unit for different optical patterns 345 performs image processing of combining the depth map resulting from the processing with the rough depth map 350.

The depth map resulting from the processing at the ToF signal analysis unit for different optical patterns 345 is stored in a storage, and so on as the precise depth map 355, and the information of the stored precise depth map 355 is outputted to a graphic processing unit, and so on for 3D modeling of the object or gesture recognition.

Figure 4:
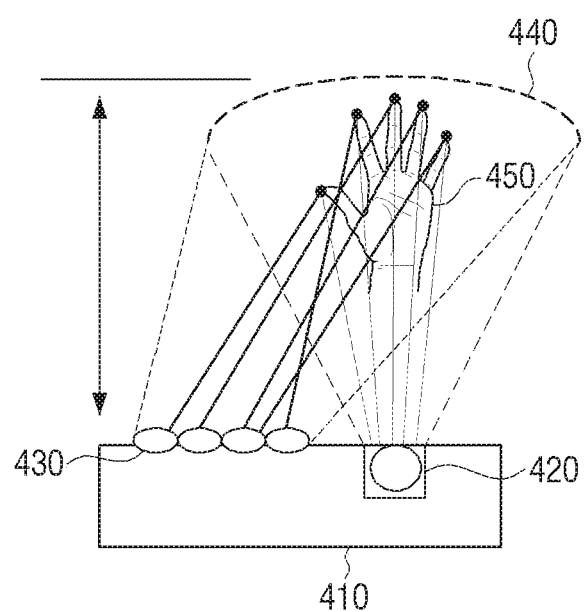
FIGS. 4 to 6 are views provided to explain a technique for generating a depth map of a hand by an optical measuring device according to an embodiment of the present disclosure.
Figure 5:
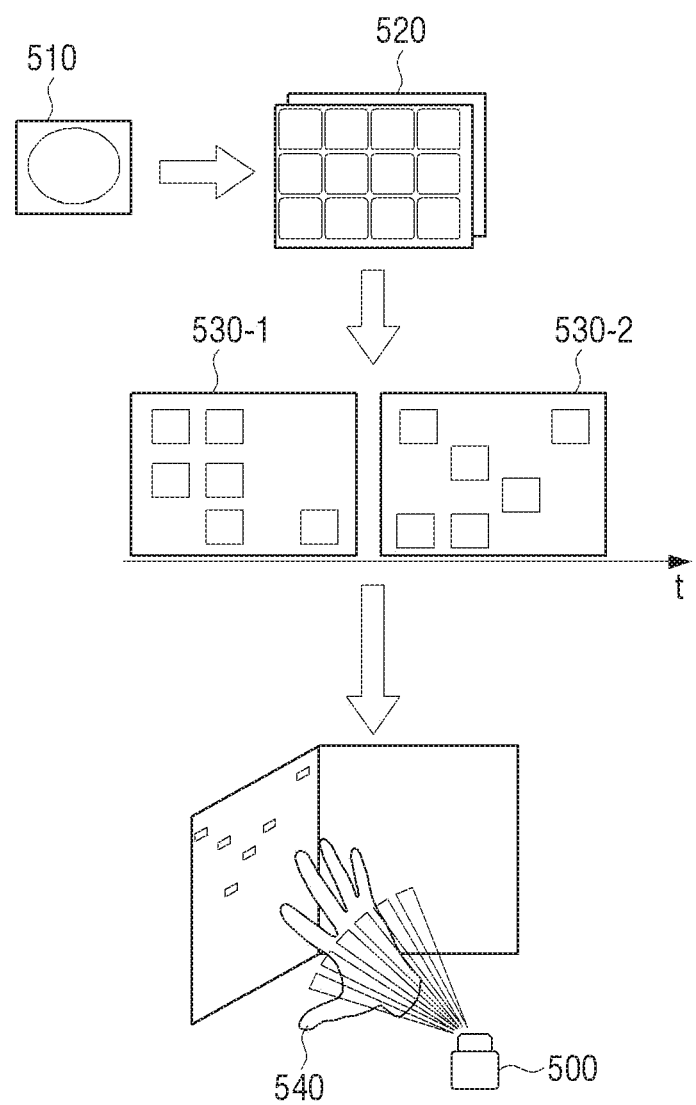
Figure 6:
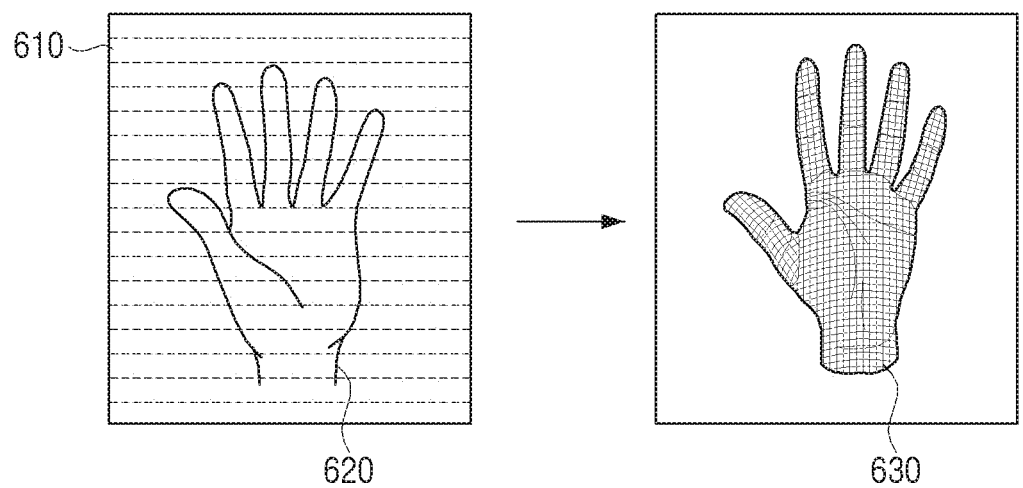

FIGS. 4 to 6 are views provided to explain a technique for generating a depth map of a hand by an optical measuring device according to an embodiment of the present disclosure.

FIG. 4 schematically illustrates the operation of the optical device 410 that illuminates the hand 450 to acquire depth information. Referring to FIG. 4, the optical device 410 includes a projector 420 that irradiates electromagnetic wave to the monitoring zone 440 and an optical receiver 430 that receives waves.

The projector 420 radiates time and spatial light modulated electromagnetic wave to the monitoring zone 440 in front. Then, the hand 450 present in the monitoring zone 440 receives and reflects electromagnetic wave. The reflected electromagnetic wave is received by the optical receiver 430. The optical device 410 to be implemented is not limited to that shown in FIG. 4, and is not limited to the shape or arrangement of the illustrated projector 420 and optical receiver 430. Although four light receiving elements are shown in FIG. 4, the present disclosure is not limited thereto, and accordingly, one or a plurality of light receiving elements may be implemented. Further, the distance between the hand 420 and the optical device 410 may be several meters or more.

Referring to FIG. 5, there is schematically shown the operation and flow of modulating an electromagnetic wave and illuminating it onto a hand. Referring to FIG. 5, an electromagnetic wave is radiated from the light source 510. The electromagnetic wave radiated from here may be an infrared (IR) laser.

The electromagnetic wave radiated from the light source 510 passes through the SLM 520. Specifically, the electromagnetic wave may pass through the SLM 520 for spatial light modulation. In one example, the SLM 520 may be a micromirror array. Further, the SLM 520 may form a plurality of binary patterns by a specific electric signal. In this example, a plurality of binary patterns make up one set. Specifically, the binary patterns determine a portion of the SLM 520 where the IR laser will pass through and a portion to be blocked. Further, a plurality of binary patterns making up one set of patterns are different from each other. Also, one set of patterns is composed such that laser beam is illuminated across the entire area. In other words, one set of binary patterns is composed such that there is no area where the laser beam does not reach.

The electromagnetic wave is spatially modulated by the SLM 520. The spatially modulated, one or a plurality of laser beams 530-1, 530-2 vary according to time. The information of the pattern of the modulated electromagnetic wave and the time information of applying the pattern are used for demodulation of reflected wave signal and ToF computation.

Finally, when the electromagnetic wave modulated at the projector 500 (i.e., the laser beam pattern) is illuminated on the object 540 in the monitoring zone, the pattern of the reflected wave reflected from the object is varied according to the shape of the object. Specifically, unlike the output resulting from receiving the light with maintaining a laser beam pattern and without a delay, when the optical receiver receives the pattern of the reflected wave incident on the specific optical path at a specific angle from the surface of the object having the 3D shape, the resulting output is varied according to the shape of the object. This will be described in greater detail below with reference to FIG. 10.

Referring to FIG. 6, when the light is focused toward the hand 620 and the laser beam, modulated by switching one set of patterns at high speed, is irradiated, a 3D hand 630 modeled using the depth information of the object acquired from the monitoring zone and the reflected wave, is shown.

Figure 7:
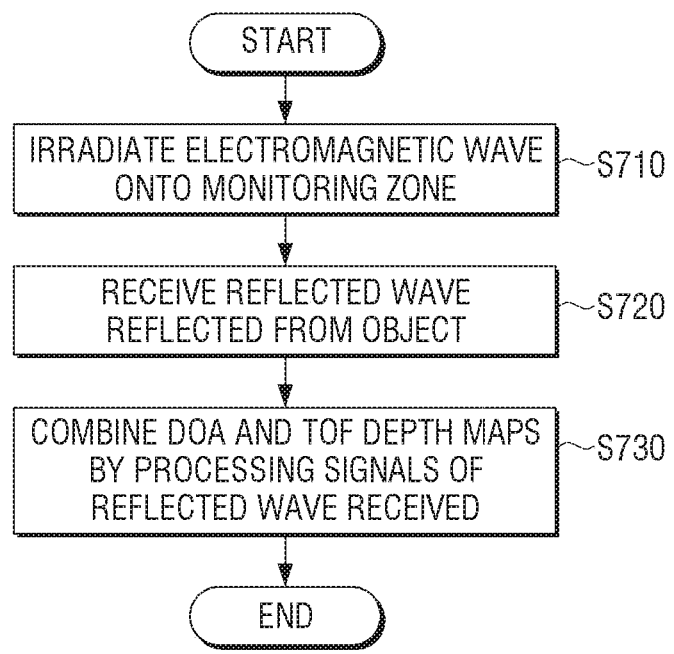
FIG. 7 is a flowchart provided to explain a depth information generating method according to an embodiment of the present disclosure.

FIG. 7 is a flowchart provided to explain a depth information generating method according to an embodiment of the present disclosure.

Referring to FIG. 7, an electromagnetic wave is irradiated to the monitoring zone, at 5710. Specifically, the optical device may irradiate time and spatial light modulated electromagnetic wave to the monitoring zone. In the above operation, a process of identifying an object in the monitoring zone by irradiating the omnidirectional electromagnetic wave may be further included.

Next, the reflected wave reflected from the object is received, at 5720. Specifically, the optical device may receive some of the reflected waves which are the irradiated electromagnetic wave impinging on and reflected from the object positioned in the monitoring zone.

Further, the received reflected wave signal is processed to combine the depth map of DoA and the depth map of ToF, at 5730. Specifically, the optical device may generate one depth map by combining the first depth map generated according to the DoA algorithm and the second depth map generated according to the ToF algorithm using a signal of the received reflected wave.

The process of processing the signal of the received reflected wave may include a process of performing a correlation operation using the known impulse response and the actual output of the light receiving element used. In addition, the direction of arrival spectrum for the elevation angle and the azimuth angle may be calculated as a result of the correlation operation. Further, the computation for calculating the direction of arrival spectrum may further include an operation for removing sidelobes.

The depth information generating method described above may generate a high-resolution depth map that is robust against noise, economical, and capable of real-time processing.

Figure 8:
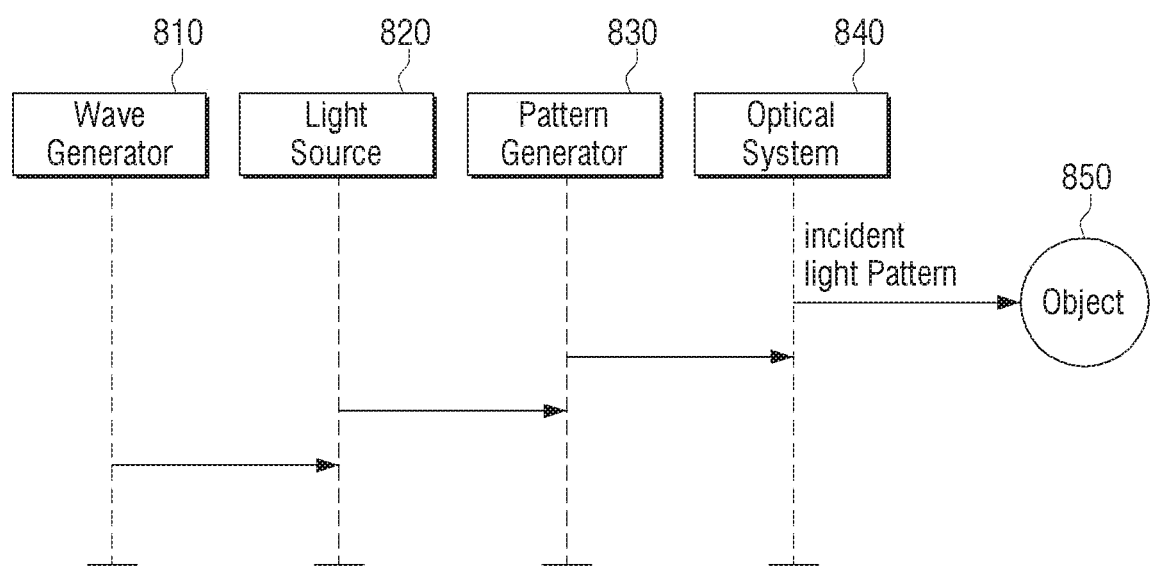
FIGS. 8 and 9 are views provided to explain blocks showing the detailed configuration of a transmitter and a receiver, and a flow of signals transmitted among the blocks.
Figure 9:
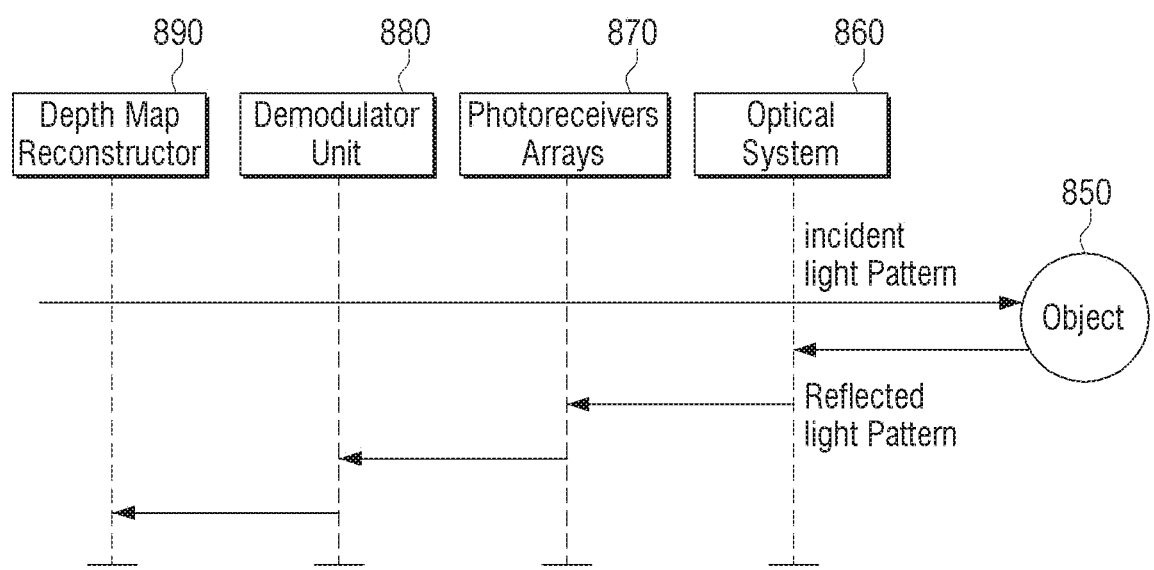

FIGS. 8 and 9 are views provided to explain blocks showing the detailed configuration of a transmitter and a receiver, and a flow of signals transmitted between the blocks.

Referring to FIG. 8, the wave generator 810 delivers the information such as intensity of an electromagnetic wave, a carrier frequency, a message, and so on according to the light source 820.

The light source 820 radiates electromagnetic wave based on the received information.

The radiated electromagnetic wave is also spatially modulated by the pattern generator 830.

The optical system 840 steers such that the modulated electromagnetic wave is propagated to a scene of interest of the monitoring zone where the object 850 is located.

Referring to FIG. 9, when the patterned incident light impinges on the object 850 and is reflected, a pattern of the reflected light passes through an optical system 860 that collects light and blocks external noise to arrive at the optical receivers arrays 870.

The demodulator unit 880 demodulates the electric signal of the optical receivers arrays 870.

The depth map reconstructor 890 reconstructs a depth map based on the demodulated information.

Figure 10:
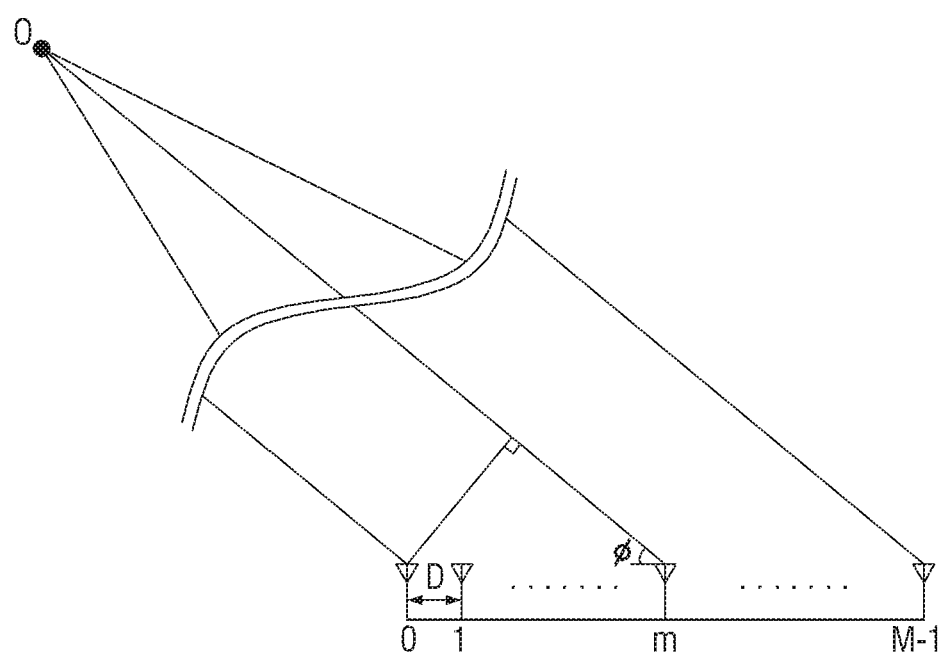
FIG. 10 is a view provided to explain an optical path of a wave received by any one of a plurality of two-dimensionally arranged light receiving elements.

Hereinafter, computation formulas used in the DoA algorithm will be described with reference to FIGS. 10 to 13. In this example, as shown in FIG. 10, the optical receiver is assumed to be a linear array antenna in which the light receiving elements constituting the optical receiver are arranged one-dimensionally.

Further, prior to further describing the following embodiment, certain terms (notations) used to describe the present disclosure will be defined as below.

Q: Number of signals $M=M_1 \cdot M_2$: Total number of light receiving elements, where, when the receiver is a lattice array, $M_1$ is the number of light receiving elements in one axis direction and $M_2$ is the number of light receiving elements in the other axis direction m: Index for identifying M number of light receiving element from 0 to M−1

Δ: Wavelength of the impulse (m)

c: Speed of light (m/s)

t: Time (s)

D: Distance between light receiving elements (m)

h(t): Impulse response function of the light receiving element $\vec{k}$: Wave vector representing the reflected wave incident on the receiver $\vec{r}_m$: Radius vector representing the position and direction of the m-th light receiving element $d_l$, l=0 . . . L−1: Distance from the origin to the measurement point, where l is an index to distinguish between different distances and is an integer from 0 to L−1

$\phi_q^{(l)}$, $\theta_q^{(l)}$, q=0 . . . $Q_l$−1: Azimuth angle and elevation angle, which are located at a distance $d_l$ and which represent an incident angle of a reflected wave, where q is an index for identifying $Q_l$ number of signals reflected at distance $d_l$, and is an integer from 0 to $Q_l$−1

FIG. 10 is a view provided to explain an optical path of a wave received by any one of a plurality of two-dimensionally arranged light receiving elements.

Referring to FIG. 10, a plurality of (m) light receiving elements from 0th to (M−1)th elements are arranged at equal intervals D. Further, a reflected wave signal reflected at a point of the object O from a distance d relatively greater than the length of arrangement of the plurality of light receiving elements enters substantially parallel to each of the plurality of light receiving elements.

Under these conditions, the coordinates according to the distance from the light receiving element located at origin (m=0) and the direction of arrival of the signal may be summarized as shown in the below table.

TABLE 1

Coordinates of estimating points.

| Distance | Directions |
|---|---|
| $d_0$ | $\phi_0^{(0)}, \ldots, \phi_{Q_0-1}^{(0)}$ |
| $d_1$ | $\phi_0^{(1)}, \ldots, \phi_{Q_1-1}^{(1)}$ |
| ... | ... |
| $d_{L-1}$ | $\phi_0^{(L-1)}, \ldots, \phi_{Q_{L-1}-1}^{(L-1)}$ |

When the m-th light receiving element receives a signal in the direction of arrival φ from a position located at a distance d, the output is as below.

$$a_m(\phi, t, d) = h\left[t - \frac{\cos(\phi) \cdot m \cdot D + 2 \cdot d}{c}\right] \quad \text{[Equation 1]}$$

where, $a_m(\phi,t,d)$ represents a function of the output estimated from the impulse response h(t) when the light receiving element m receives a pulse-shaped incoming wave from one point. Further, a vector $\vec{a}$ having $\{a_m(\phi, t,d)\}_{m=0}^{M-1}$ of respective light receiving elements as a vector component with respect to one set of all light receiving elements (m=0, ..., M−1) of the antenna array is referred to as a steering vector.

Meanwhile, referring to Table 1 above, the output of the m-th light receiving element of the antenna array is as below.

$$x_m(t) = \sum_{l=0}^{L-1} \sum_{q=0}^{Q_l-1} a_m(\phi_q^l, \theta_q^l, d_l) \quad \text{[Equation 2]}$$

That is, the output $x_m(t)$ of the m-th light receiving element is the total of the $a_m(\phi,t,d)$ for all the incident directions (q=0, ..., $Q_l$−1) and all distances (l=0, ..., L−1).

Further, the spectrum of the pulses arriving from the points positioned at the distance $d_l$ may be expressed as below.

$$P^l(\psi) = \int_0^T \sum_{m=0}^{M-1} x_m(t) \cdot a_m(\psi, t, d_l) dt \quad \text{[Equation 3]}$$

where, T represents one cycle time of the impulse response of the light receiving element.

Figure 11:
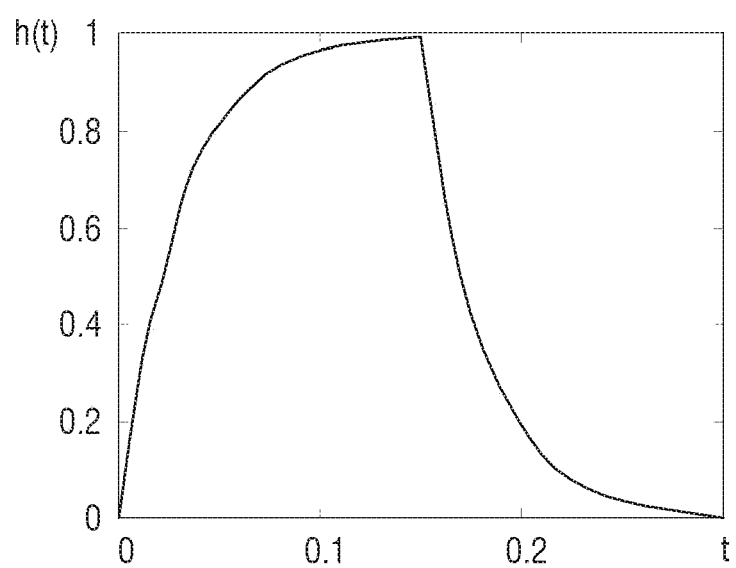
FIG. 11 is a graph showing the impulse response of the receiver.

In an embodiment of the present disclosure, the function h(t) representing the impulse response of a photodiode constituting the antenna array is as below.

$$h(f, T, t) = \quad \text{[Equation 4]}$$
$$\begin{cases} 1 - \exp\left(-\frac{t}{T}\right) & \text{if } t \in [0, T \cdot \ln(1 + \exp(f))) \\ \exp\left(\frac{t - f \cdot T}{T}\right) & \text{if } t \in [T \cdot \ln(1 + \exp(f)), 2 \cdot f \cdot T)) \\ 0 & \text{otherwise} \end{cases}$$

where, when a conventional silica photodiode is used, f=5, T=0.03, and a graph of a function h (f=5, T=0.03, t) is as shown in FIG. 11.

Meanwhile, the domain definition of the function $a_m(\psi, t, d_l)$ is [m·D·cos(φ)+2$d_l$, m·D·cos(φ)+Δ+2$d_l$]. Therefore, the integration section of Equation 3 above may be reduced as below.

$$P^l(\psi) = \sum_{m=0}^{M-1} \int_{\frac{m \cdot D \cdot \cos(\phi) + 2d_l}{c}}^{\frac{m \cdot D \cdot \cos(\phi) + \Delta + 2d_l}{c}} x_m(t) \cdot a_m(\psi, t, d_l) dt \quad \text{[Equation 5]}$$

Further, in order to compute the integration of Equation 5, below Gaussian quadrature formula may be used.

$$\int_a^b f(t) dt = \frac{b-a}{2} \sum_{p=0}^{n-1} D_p f\left(\frac{b-a}{2} d_p + \frac{b+a}{2}\right), \quad \text{[Equation 6]}$$

where, p is an integer (p=0, 1, ..., n−1) from 0 to n−1, and $D_p$ and $d_p$ are coefficients of the Gaussian quadrature formula.

Figure 12:
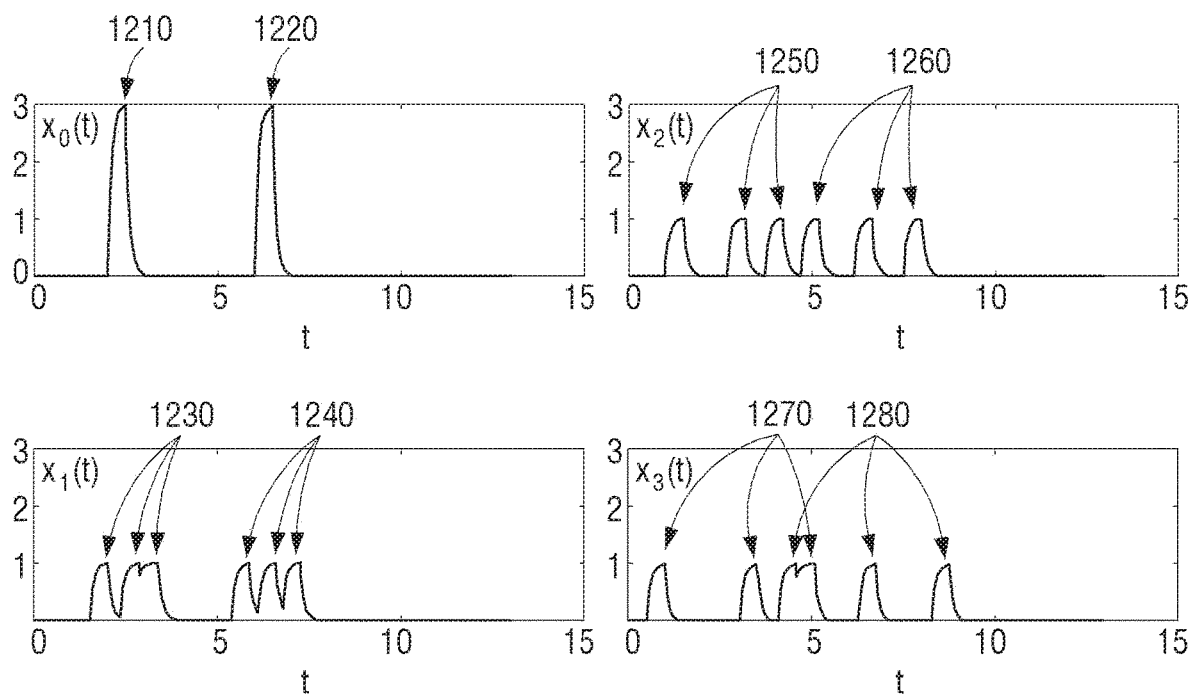
FIG. 12 is a graph showing the outputs of the four receivers of FIG. 11 that have received reflected waves in three directions from two different distances.

FIG. 12 is a graph showing outputs of the four receivers of FIG. 11 receiving reflected waves in three directions from two different distances.

Specifically, the four graphs in FIG. 12 represent outputs $x_0(t)$, $x_1(t)$, $x_2(t)$, $x_3(t)$ of four light receiving elements (m=0, 1, 2, 3) arranged consecutively in a row. Further, the distance between the light receiving element is D=Δ=1, and the reflected waves incident on the receivers are received from a distance ($d_0$=1) from the origin (m=0) and points in directions of 30, 70, and 120 degrees, and from a distance ($d_1$=3) from the origin (m=0), and points in directions of 40, 85, and 130 degrees.

Referring to the graph of $x_0(t)$ for the light receiving element at the origin (m=0), the signals of the reflected waves received at three points located at the same distance are superimposed such that the peaks 1210, 1220 of the graph are indicated as magnitude 3. There is a time difference between the signals of the reflected waves received from different distances from each other.

Referring the graph of $x_1(t)$ for the light receiving element at m=1 spaced from the origin by D, it can be seen that three peaks 1230 appear in the graph for each of the signals for the three reflected waves located at d0 from the origin and in different directions of arrival of 30, 70, and 120 degrees. Also, it can be seen that three peaks 1240 appear in the graph for each of the signals for each of the three reflected waves located at $d_l$ from the origin and in different directions of arrival 40, 85, and 130 degrees.

Referring the graph of $x_2(t)$ for the light receiving element at m=2 spaced from the origin by 2D, it can be seen that the time at which the signal arrives, that is, the distance between the peaks 1250, 1260, is greater than $x_1(t)$.

Referring the graph of $x_3(t)$ for the light receiving element at m=3 spaced from the origin by 3D, it can be seen that the time at which the signal arrives, that is, the distance between the peaks 1270 and 1280, is greater than $x_2(t)$.

Figure 13:
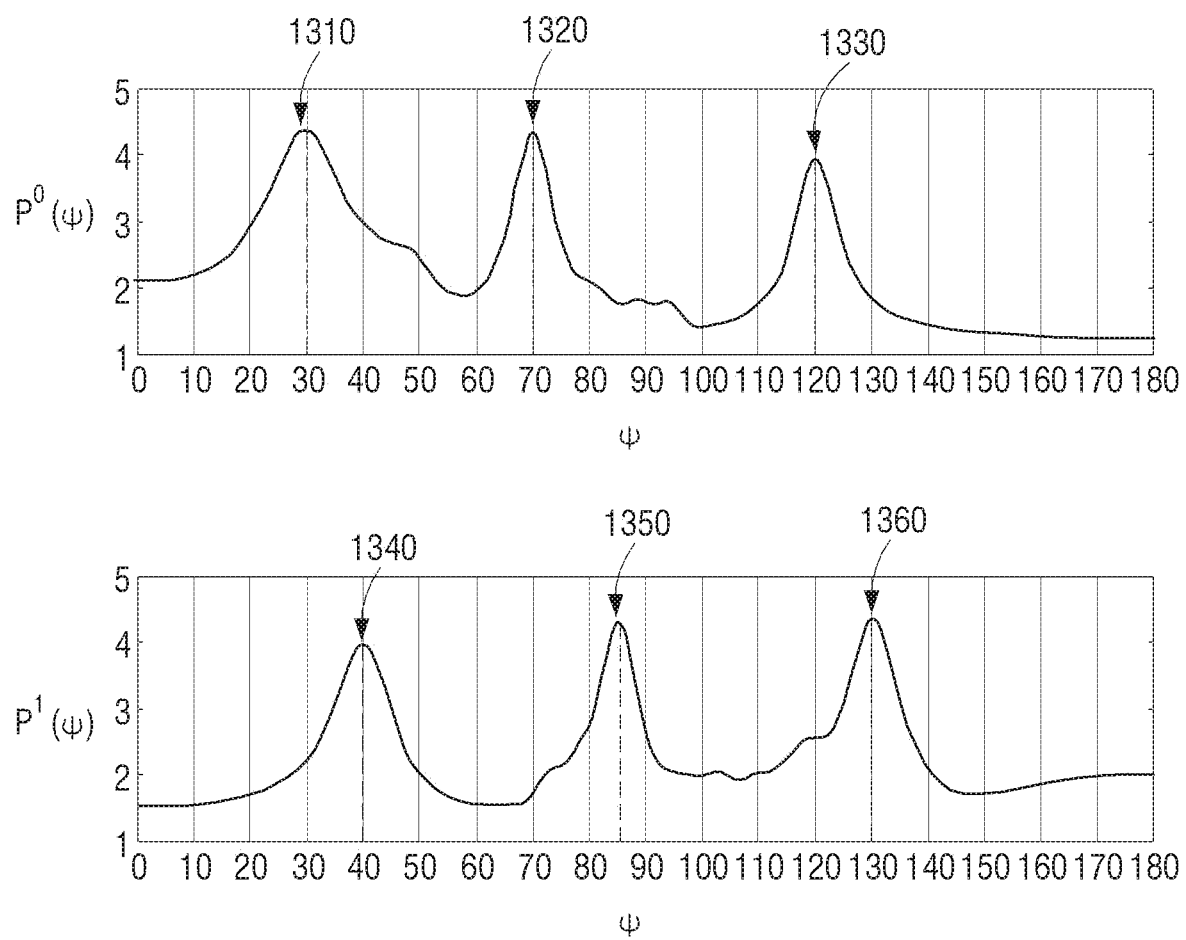
FIG. 13 is a spectral graph for two different distances calculated by correlation operation of the output and the impulse response of FIG. 12.

FIG. 13 is a spectral graph for two different distances calculated by correlation operation of the output and the impulse response of FIG. 12.

Referring the FIG. 13, it can be seen that peaks 1310, 1320, 1330 appear at ψ values that correspond to the directions of arrival 30, 70 and 120 degrees in the graph of the spectrum $P^0(\psi)$ for the distance (d0=1) from the origin (m=0).

In addition, it can also be seen that the peaks 1340, 1350 and 1360 appear at ψ values that correspond to the directions of arrival of 40, 85 and 130 degrees in the graph of the spectrum $P^1(\psi)$ for the distance ($d_1$=3) from the origin (m=0).

Figure 14:
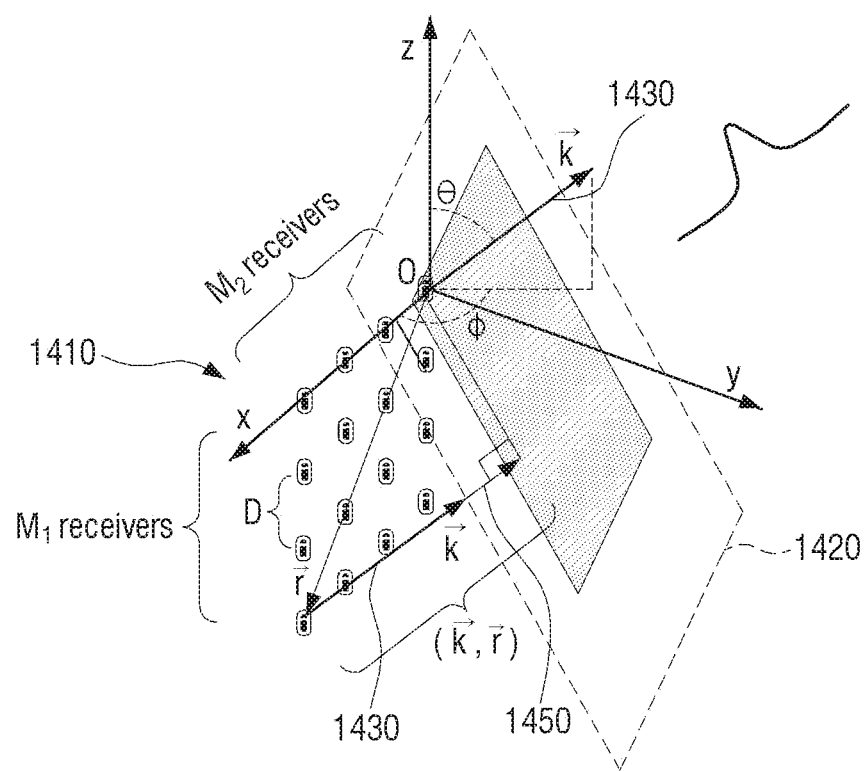
FIG. 14 is a view provided to explain a coordinate system with reference to a receiver of an optical device according to an embodiment of the present disclosure.

FIG. 14 is a view provided to explain a coordinate system based on a receiver of an optical device according to an embodiment of the present disclosure.

Referring to FIG. 14, optical receiver 1410 in which M=$M_1 \cdot M_2$ number of light receiving elements (m= 0, 1, ..., M−1) is arranged in a lattice form in the (x, −z) plane in the vertical coordinate system (x, y, z) of the 3D space is shown.

Further, an impulse plane wave 1420 incoming from the object toward the optical receiver 1410 is shown.

Further, a wave vector $\vec{k}$ representing a reflected wave incident on the optical receiver and a radius vector $\vec{r}_m$ representing an m-th light receiving element among a plurality of light receiving elements composing the optical receiver are shown.

In the above example, for convenience of computation, the wave vector $\vec{k}$ and the radius vector $\vec{r}_m$ are expressed with spherical coordinates having an elevation angle θ and an azimuth angle φ as components.

The wave vector $\vec{k}$ is as below.

$$\vec{k} = (\sin(\theta)\cdot\cos(\phi), \sin(\theta)\cdot\sin(\phi), \cos(\theta)) \quad \text{[Equation 7]}$$

Further, in the ($M_1$ by $M_2$) array antenna, the radius vector $\vec{r}_m$ of the light receiving element m positioned at $m_1$-th position in a horizontal direction and $m_2$-th in a vertical direction is as below.

$$\vec{r}_m = (m_1 D, 0, m_2 D) \quad \text{[Equation 8]}$$

The output of the light receiving element located at the origin (0, 0) is $$a_0(t) = h\left(t - 2\cdot\frac{d}{c}\right).$$

Further, the distance from the plane incident wave to the m-th light receiving element can be expressed as $(\vec{k}, \vec{r}_m)$. Thus, the steering vector $\vec{a}(t, \theta, \phi, d)$ may be represented as below.

$$a_m(t, \theta, \phi, d) = h\left(t - 2\cdot\frac{d}{c} - \frac{(\vec{k}, \vec{r}_m)}{c}\right) \quad \text{[Equation 9]}$$

where, the scalar product $(\vec{k}, \vec{r}_m)$ of the two vectors is:

$$(\vec{k}, \vec{r}_m) = D(\sin(\theta)\cdot\cos(\phi)\cdot m_1(m) + \cos(\theta)\cdot m_2(m))$$

where, $m_1(m)$ and $m_2(m)$ represent the abscissa and ordinate values of the m-th light receiving element.

Meanwhile, the output vector $\vec{x}(t)$ may be expressed as below.

$$x_m(t) = \sum_{l=0}^{L-1} \sum_{q=0}^{Q_l-1} a_m(\phi_q^l, \theta_q^l, d_l) \quad \text{[Equation 10]}$$

Further, the spectrum may be computed by the below equation.

$$P^l(\theta, \phi) = \sum_{m=0}^{M-1} \int_{\frac{(\vec{k}, \vec{r}_m)}{c}}^{\frac{(\vec{k}, \vec{r}_m)}{c}+\Delta} x_m(t) \cdot a_m(\theta, \phi, t, d_l) \, dt \quad \text{[Equation 11]}$$

Figure 15:
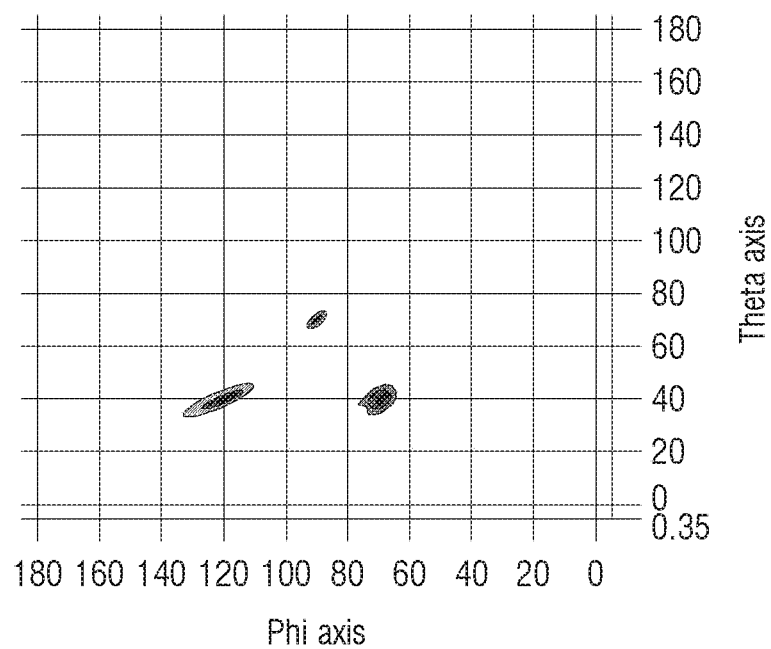
FIGS. 15 and 16 are graphs showing spectrums when reflected waves in three directions are respectively received by the receiver of FIG. 14 from two different distances.
Figure 16:
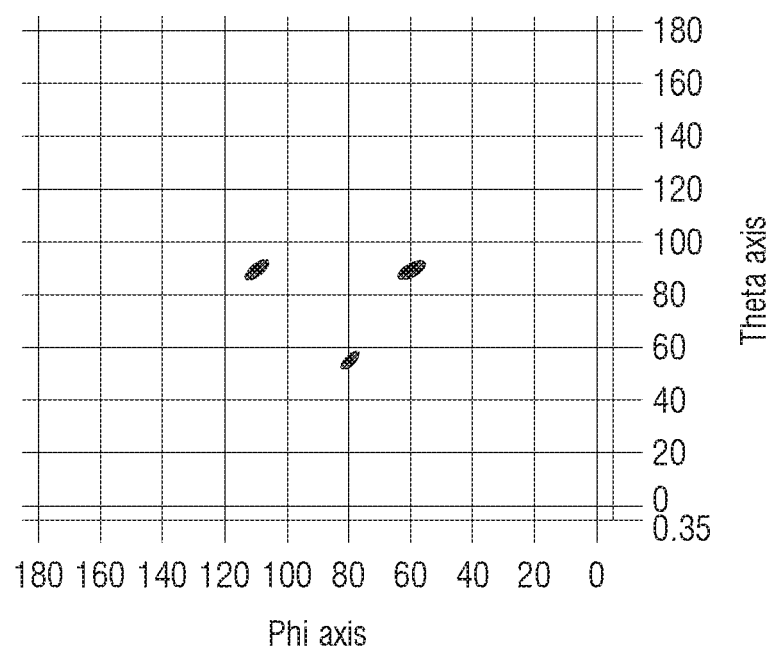

FIGS. 15 and 16 are graphs showing spectrums when reflected waves in three directions are respectively received at the receiver of FIG. 14 from two different distances.

First, it is assumed that the antenna array is composed of $M_1 = M_2 = 5$, $D = 2\cdot\Delta$.

FIG. 15 is a spectrum for $d_0 = 20\Delta$, $\theta^{(0)} = (70, 40, 40)$ deg and $\phi^{(0)} = (90, 70, 120)$ deg. FIG. 16 is a spectrum for $d_1 = 24\Delta$, $\theta^{(1)} = (55, 90, 90)$ deg, $\phi^{(1)} = (80, 60, 110)$ deg.

Figure 17:
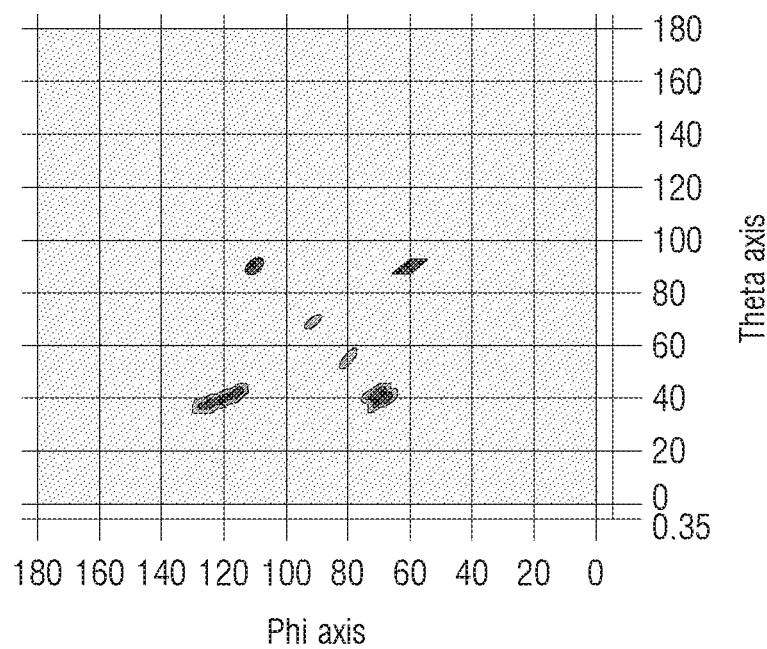
FIG. 17 is a graph combining the two spectrums shown in FIGS. 15 and 16.

Further, FIG. 17 is a graph merging the two spectrums in FIGS. 15 and 16.

As described above, the DoA estimation algorithm proposed by the present disclosure can generate a wide range of depth maps unlike the conventional ToF camera having a small aperture. Also, unlike the classical DoA, the DoA estimation algorithm can also acquire distance information.

Figure 18:
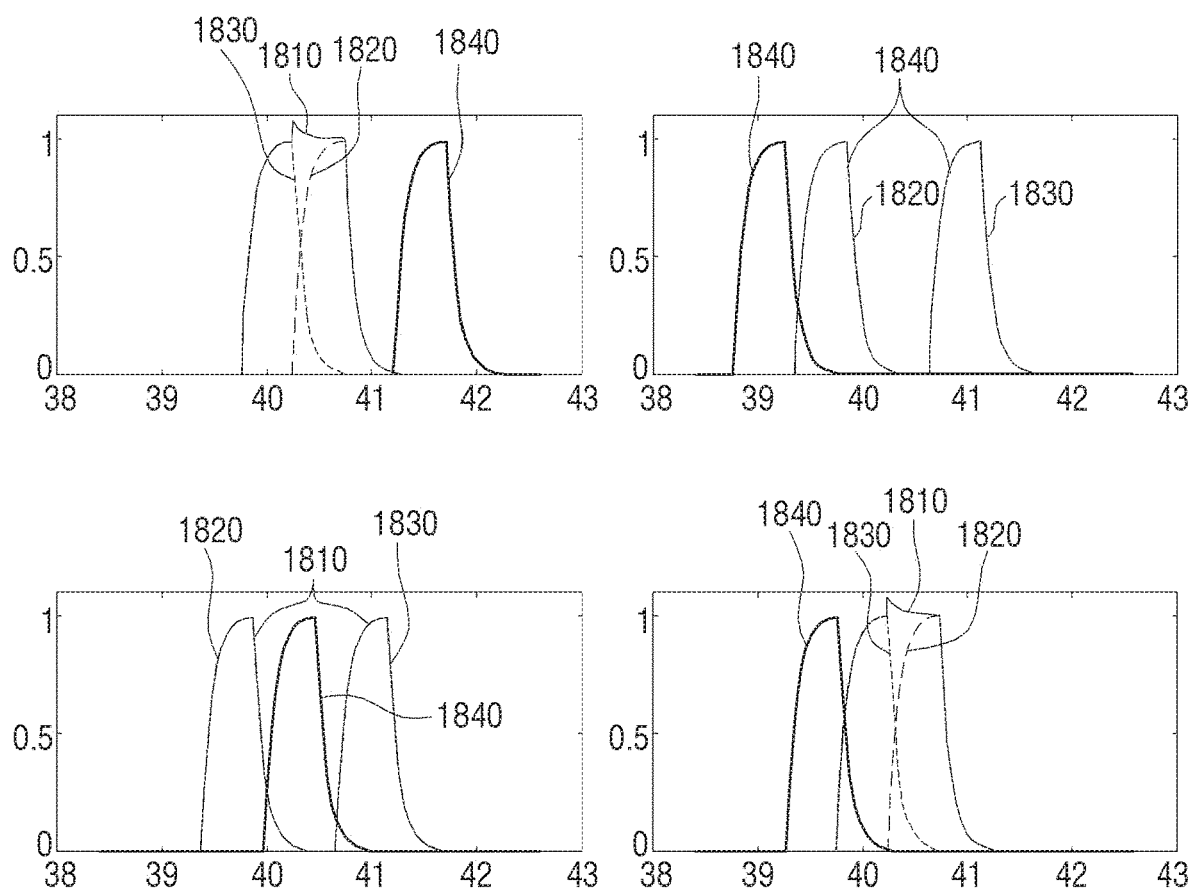
FIG. 18 is a graph showing the output of a UCA receiver that has received reflected waves from two points having different incident angles at the same distance, together with the steering vector components having the same distance and different incident angles.

FIG. 18 is a graph illustrating the output of a UCA receiver that received reflected waves from two points having different incident angle at the same distance, together with the steering vector component having the same distance and different incident angles.

FIG. 18 illustrates an example based on an assumption that the projector illuminates Q points using an impulse laser and an optical receiver composed of UCA receives electromagnetic waves which impinge on and scattered from the object.

The four light receiving elements constituting the UCA antenna receive signals with an incident angle of $\phi=60$, $\theta=120$ (1820, blue) and $\phi=60$ and $\theta=120$ (1830, green) respectively from the distance ($d=20\Delta$). Further, the output (1810, red) of the light receiving element is the sum of the outputs 1820, 1830 for each signals of the two points.

Further, the steering vector $\vec{a}(t, \theta, \phi, d)$ (black) is for a distance ($d=20\Delta$), and incident angles ($\phi=50$, and $\theta=50$).

In the foregoing description, the below spectrum function is used for comparing the output vector with the steering vector.

$$P^l(\theta, \phi) = (\vec{x}(t), \vec{a}(\theta, \phi, t, d_l))_2 = \sum_{m=0}^{M-1} (x_m(t) \cdot a_m(\theta, \phi, t, d_l))_2 \quad \text{[Equation 12]}$$

where, the subscript 2 in parentheses represents the scalar product of the two vectors in the Hilbert space.

Also, in the present disclosure, the below function is proposed to remove the sidelobes of the spectrum.

Let Equation 12 above be converted as below.

$$P^l(\theta, \phi) = \begin{bmatrix} \sum_{m=0}^{M-1} \langle x_m, a_m \rangle, & \text{if } \forall_m \langle x_m, a_m \rangle \neq 0 \\ 0, & \text{otherwise} \end{bmatrix} \quad \text{[Equation 13]}$$

where, $\langle x_m, a_m \rangle$ is as below:

$$\langle x_m, a_m \rangle = \begin{bmatrix} \frac{1}{M}, & \text{if } \frac{(x_m, a_m)}{\|x_m\|\cdot\|a_m\|} > \varepsilon, \varepsilon \in (0, 1) \\ 0, & \text{otherwise} \end{bmatrix} \quad \text{[Equation 14]}$$

where, $(x_m, a_m)$ is as below:

$$(x_m, a_m) = \int_{\frac{(\vec{k}, \vec{r}_m)}{c}}^{\frac{(\vec{k}, \vec{r}_m)}{c}+\Delta} x_m(t) \cdot a_m(\theta, \phi, t, d_l) \, dt \quad \text{[Equation 15]}$$

Figure 19:
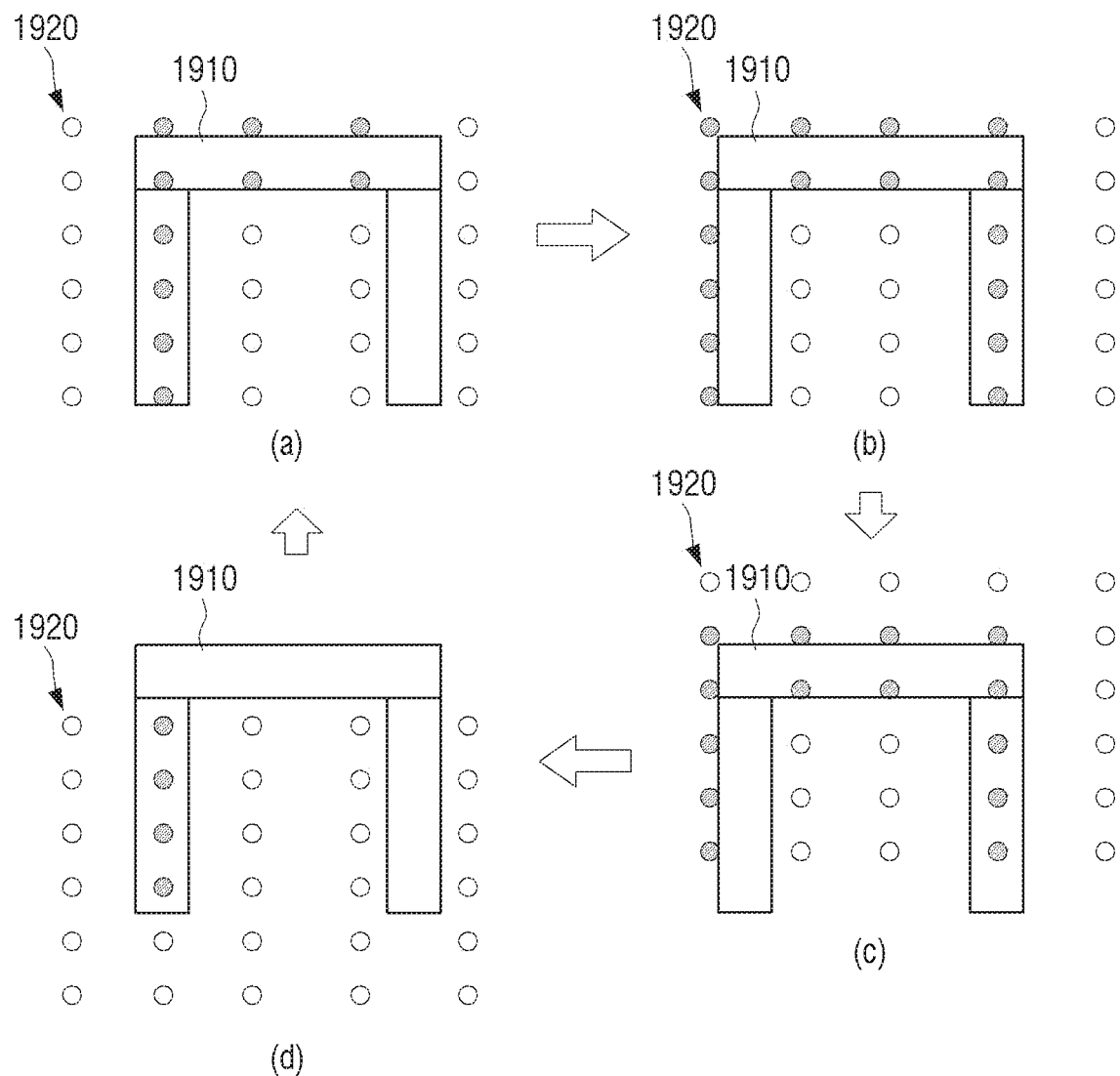
FIG. 19 is a view illustrating an operation of a plurality of laser beams scanning an object.

FIG. 19 is a view illustrating an operation in which a plurality of laser beams scan an object.

In an embodiment of the present disclosure, when the projector is focused on an object, the optical device may irradiate the object with a signal $Q = Q_\theta^{grid} \times Q_\phi^{grid}$ of a plurality of modulated laser beams in order to obtain depth information of the object. At this time, the optical device may irradiate the object while moving the laser beam in a preset direction. Specifically, the optical device may perform a scanning operation for shifting the starting angle for irradiating a plurality of laser beams by $N_\theta$ times in the direction $\theta$ and by $N_\phi$ times in direction $\phi$.

A (5×6) laser beam 1920 scans around the object 1910, as shown in FIG. 10. The beams shown in different colors in the laser beam 1920 represent beam which is impinged on and reflected from the object.

Figure 20:
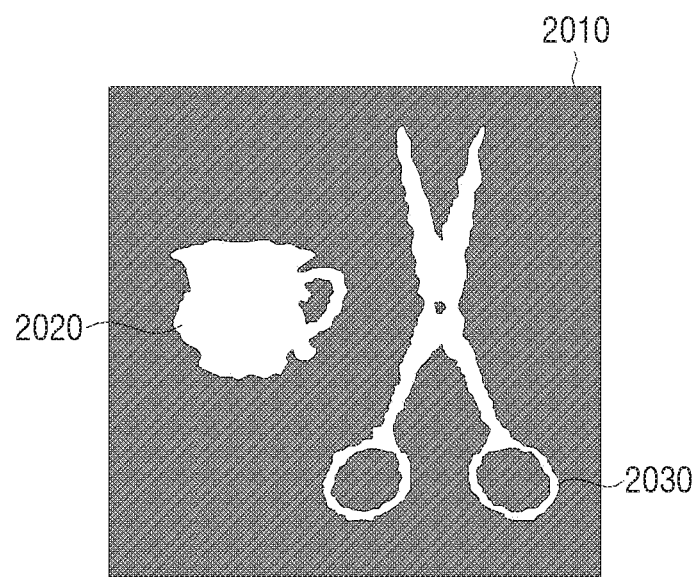
FIG. 20 is a view showing the shape of objects from which sidelobes have been removed.

FIG. 20 is a view showing the shapes of objects from which sidelobes have been removed.

Referring to FIG. 20, as a spectrum 2010 from which sidelobes have been removed by the impulse DoA estimation method, the silhouette of the cup 2020 and the scissors 2030 can be seen.

Figure 21:
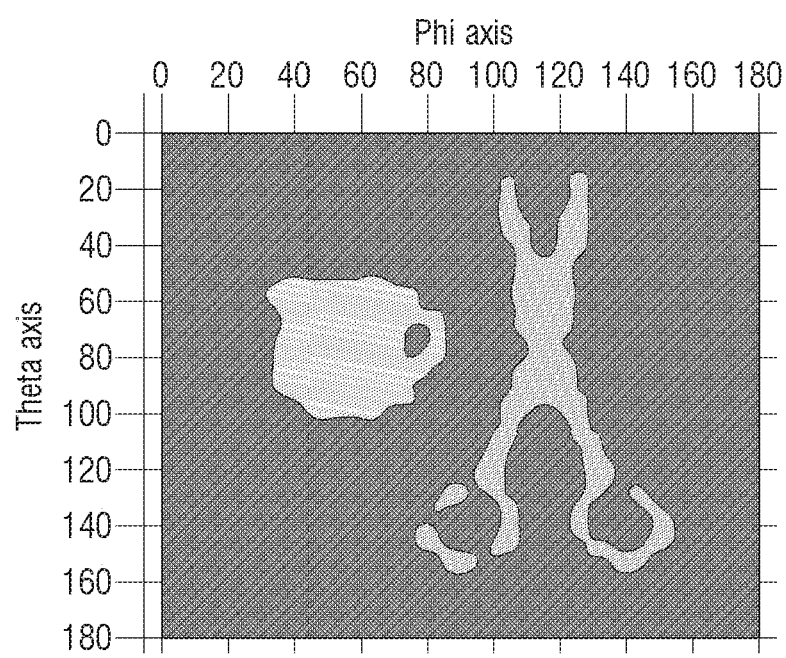
FIGS. 21 and 22 are views for comparing two spectrums calculated with varying the number of shifting the laser beam for scanning.
Figure 22:
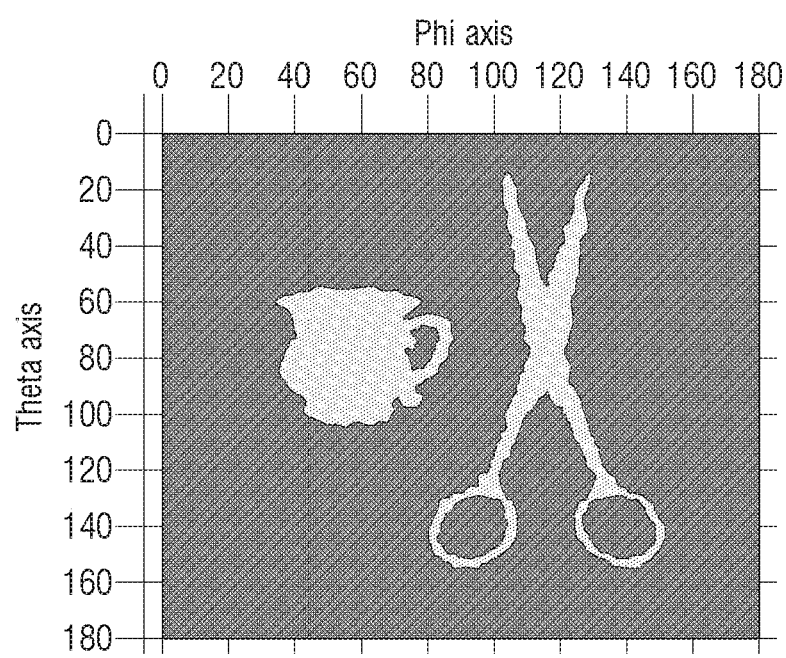

FIGS. 21 and 22 are views illustrating comparing two spectrums calculated by varying the frequency of moving the laser beam for scanning.

In FIGS. 21 and 22, the laser beam irradiated onto the object is $Q_\theta^{grid}=Q_\phi^{grid}=6$.

FIG. 21 shows the spectrum when the projector is shifted by $N_\theta=N_\phi=6$ times. Further, FIG. 22 shows the spectrum when the projector is shifted by $N_\theta=N_\phi=12$ times.

Comparing the two spectrums of FIGS. 21 and 22 shows that the objects of the spectrum are more precisely drawn when the scan is performed at a finer angle (i.e., when the projector is moved more frequently).

Figure 23:
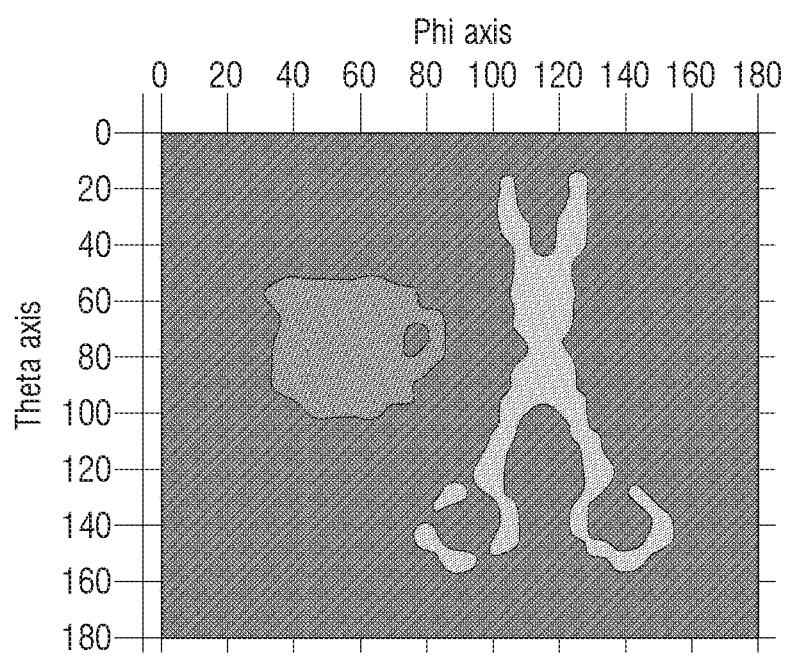
FIGS. 23 and 24 are views showing the spectrum that appears when two objects in the monitoring zone are positioned at different distances.
Figure 24:
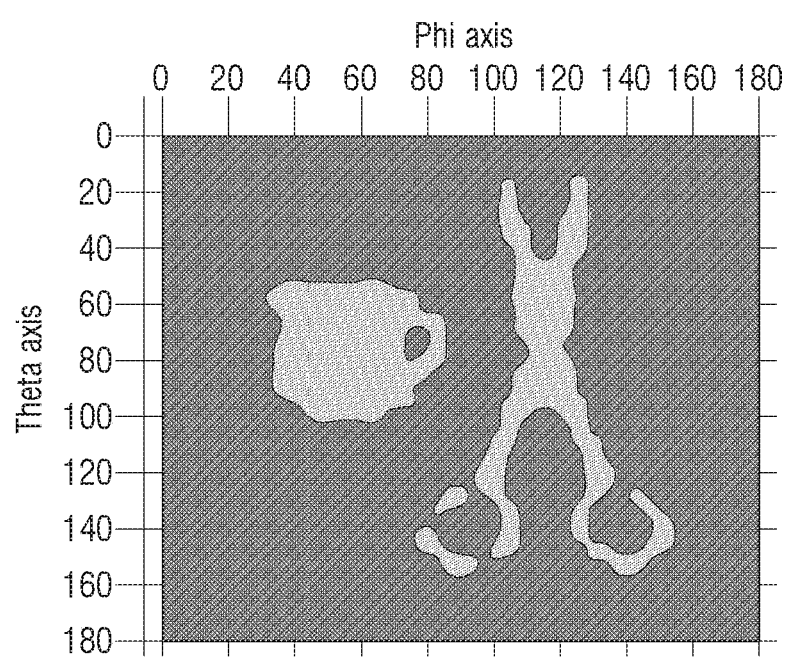

FIGS. 23 and 24 are views showing spectrums appearing when two objects in the monitoring zone are disposed at different distances.

In FIGS. 23 and 24, the laser beam irradiating the object is composed of $Q_\theta^{grid}=Q_\phi^{grid}=6$, and the laser beam is moved $N_\theta=N_\phi=6$ times.

FIG. 23 is a spectrum when the cup is located at 20Δ and the scissors are located at 10Δ. Further, FIG. 24 is a spectrum when the cup is located at 15Δ and the scissors are located at 10Δ.

As shown in FIGS. 23 and 24, it may be seen that the intensity of the spectrum varies according to the distance from the object.

Figure 25:
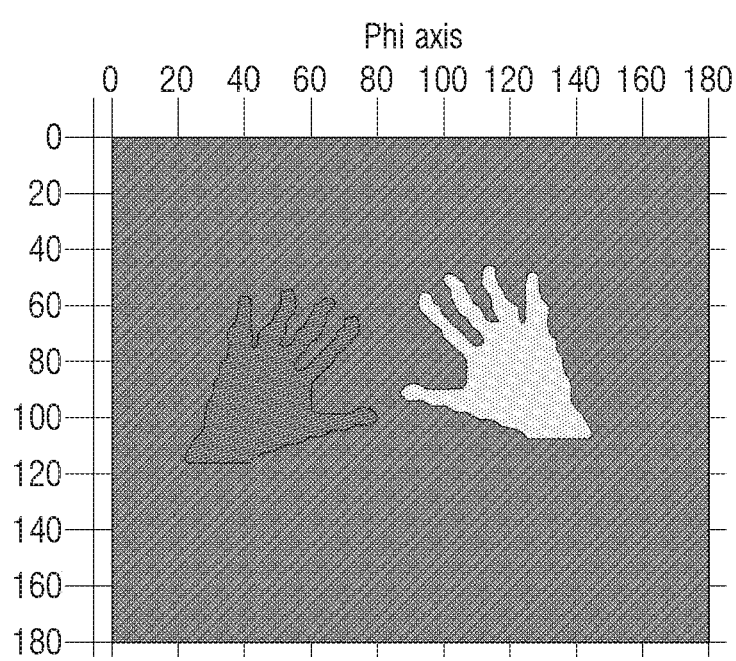
FIG. 25 is a view showing a spectrum when the left hand and the right hand are at different distances.

FIG. 25 is a view showing a spectrum when the left hand and the right hand are at different distances.

In FIG. 25, the laser beam irradiated to both hands is $Q_\theta^{grid}=Q_\phi^{grid}=12$, and the antenna receiving the reflected light is composed of UCA in which M=30 light receiving elements are arranged. In this example, the left hand is located at a distance of 20Δ, and the right hand is located at 10Δ.

As shown in FIG. 25, the optical device according to the present disclosure may calculate an accurate spectrum even for an object having a complex shape such as a hand.

Figure 26:
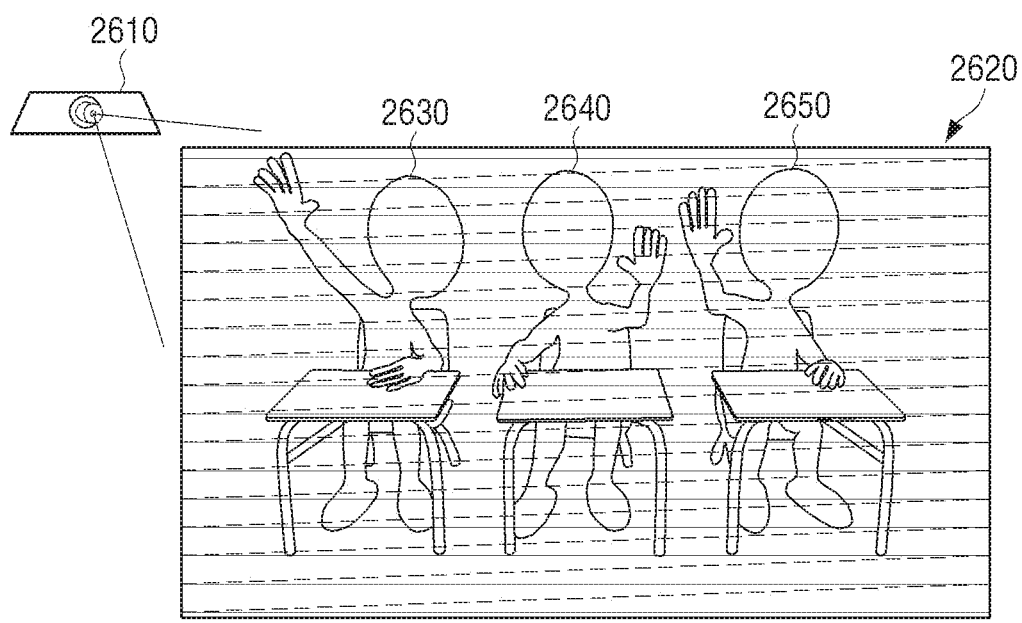
FIGS. 26 and 27 are views provided to explain an operation of identifying hand shapes posed by a plurality of users, respectively.
Figure 27:
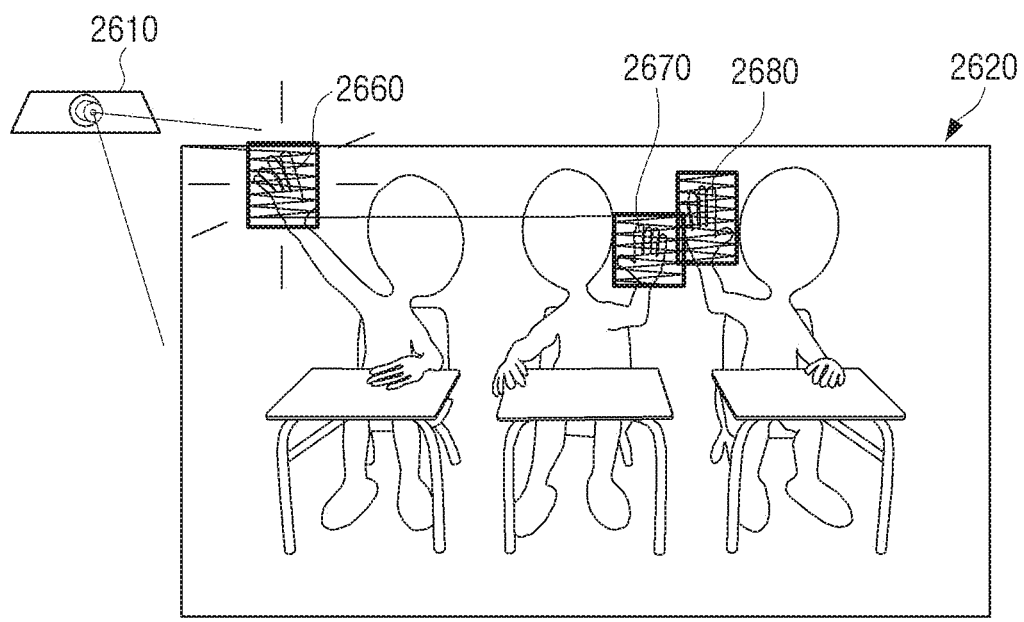

FIGS. 26 and 27 are views provided to explain an operation of identifying hand shapes made by a plurality of users, respectively.

Referring to FIG. 26, the optical device 2210 irradiates omnidirectional light over the entire monitoring zone 2220. In the monitoring zone 2220, three people 2230, 2240, 2250 are sitting and making gestures. The optical device 2210 identifies the hands appearing in the monitoring zone 2220.

Referring to FIG. 27, the optical device 2610 focuses sequentially on the positions of the three identified people's hands 2660, 2670, 2680. In one example, the optical device 2610 focuses the laser beam at the position of the initially identified hand 2660 and performs a scanning operation. Upon acquiring depth information after scanning, the optical device 2610 shifts the focus to another identified hand 2670, 2680 to scan the hand 2670.

The optical device 2610 may acquire depth information on a plurality of objects with the method described above.

A device according to the present embodiments may include a processor, a memory for storing and executing program data, a permanent storage such as a disk drive, a communication port for communicating with an external device, a viewer interface device such as a touch panel, a key, button and the like, and so on. Methods implemented with software modules or algorithms may be stored on a computer-readable recording medium as executable computer readable codes or program instructions on the processor. In one example, the computer-readable recording medium includes a magnetic storage medium (e.g., read-only memory (ROM), random-access memory (RAM), floppy disk, hard disk, etc.) and an optical reading medium (e.g., CD-ROM, digital versatile disc (DVD)), and so on. The computer-readable recording medium may be distributed over networked computer systems so that computer readable code may be stored and executed in a distributed method. The medium is readable by a computer, can stored in a memory, and executed on a processor.

The embodiments may be expressed as functional block configurations and various processing steps. These functional blocks may be implemented on a various number of hardware and/or software configurations that perform specific functions. For example, embodiments may employ integrated circuits memory, processing, logic, look-up tables, and so on that may perform various functions by control of one or more microprocessors or other control devices. Similarly to the way in which components may be implemented as software programming or software components, the present embodiments may be implemented in a programming or scripting language such as C, C++, Java, assembler, etc., including various algorithms implemented in a data structure, processes, routines, or a combination of other programming configurations. The functional aspects may be implemented with algorithms running on one or more processors. In addition, the present embodiment may employ conventional technique for electronic environment setting, signal processing, and/or data processing, and so on. Terms such as "mechanism", "element", "means", "configuration" are used extensively and are not limited to mechanical and physical configurations. The terms may include the meaning of a series of routines of software in conjunction with a processor, and so on.

The specific implementations described in the embodiments are illustrative and do not limit the scope of the disclosure in any way. For brevity of description, descriptions of conventional electronic configurations, control systems, software, and other functional aspects of such systems may be omitted. Also, the connections or connection members of the lines between the components shown in the figures are illustrative of functional connections and/or physical or circuit connections, which may possibly be replaced or expressed as variety of additional functional connections, physical connections, or circuit connections in an actual device.

Throughout the description (and particularly, in the claims), the use of the term "the" and similar indication may be applied to both singular and plural expression. In addition, when a range is described, it includes the individual values belonging to the above range (unless specified to the contrary), and the individual values constituting the above range are described in the detailed description. Finally, if there is no explicit order or contradiction to the steps constituting the method, the steps may be performed in the proper order. It is not necessarily limited to the order of the steps described herein. The use of all examples or exemplary terms (e.g., and so on) is merely intended to be illustrative of technical ideas and is not to be limited in scope by the examples or exemplary term, unless it is limited by the claims. It will also be appreciated by those skilled in the art that various modifications, combinations, and alterations may be configured according to design criteria and factors within the scope of the appended claims or equivalents thereof.

What is claimed is:

1. A depth information generating method of an optical device for generating a depth map for an object, comprising:
   irradiating an electromagnetic wave onto the object;
   receiving the electromagnetic wave reflected from the object through an optical receiver;
   generating a first depth map for the object based on a direction of arrival of the electromagnetic wave reflected from the object;
   generating a second depth map for the object based on a time during which the electromagnetic wave travels a round trip path from being reflected against the object until being received; and
   generating a depth map combining the first depth map and the second depth map.

2. The depth information generating method of claim 1, wherein the generating comprises:
   generating the first depth map from a direction of arrival spectrum calculated by performing a correlation operation on a steering vector calculated based on an impulse response of the optical receiver and an output vector of the optical receiver receiving the electromagnetic wave reflected from the object.

3. The depth information generating method of claim 2, wherein the optical receiver comprises a plurality of light receiving elements, and
   wherein the generating comprises performing the correlation operation using an equation below:

$$P^i(\theta, \phi) = (\vec{x}(t), \vec{a}(\theta, \phi, t, d_l))_2 = \sum_{m=0}^{M-1} (x_m(t) \cdot a_m(\theta, \phi, t, d_l))_2$$

where, M is a total number of the plurality of light receiving elements, $\vec{x}(t)$ is the output vector, $\vec{a}(t, \theta, \phi, d)$ is the steering vector, $x_m(t)$ is output of an m-th light receiving element, and $a_m(\theta, \varphi, t, d_l)$ is a steering vector component corresponding the m-th light receiving element.

4. The depth information generating method of claim 2, wherein the generating comprises:
   calculating a direction of arrival spectrum from which sidelobes have been removed by performing the correlation operation using an equation below; and
   generating the first depth map from the direction of arrival spectrum from which the sidelobes have been removed, $$P^i(\theta, \phi) = \begin{bmatrix} \sum_{m=0}^{M-1} \langle x_m, a_m \rangle, & \text{if } \forall_m \langle x_m, a_m \rangle \neq 0 \\ 0, & \text{otherwise} \end{bmatrix}$$

where, $\langle x_m, a_m \rangle$ is $$\langle x_m, a_m \rangle = \begin{bmatrix} \frac{1}{M}, & \text{if } \frac{(x_m, a_m)}{\|x_m\| \cdot \|a_m\|} > \varepsilon, \varepsilon \in (0, 1) \\ 0, & \text{otherwise} \end{bmatrix},$$

where, $(x_m, a_m)$ is $$(x_m, a_m) = \int_{\frac{(\vec{k}, \vec{r}_m)}{c}}^{\frac{(\vec{k}, \vec{r}_m) + \Delta}{c}} x_m(t) \cdot a_m(\theta, \phi, t, d_l) dt$$

where, M is a number of the plurality of light receiving elements, $\vec{k}$ is a wave vector representing the electromagnetic wave reflected from the object incident on the optical receiver, $\vec{r}_m$ is a radius vector representing an m-th light receiving element among the plurality of light receiving elements, $\Delta$ is a wavelength of the electromagnetic wave reflected from the object, and c is the speed of light.

5. The depth information generating method of claim 1, further comprising:
   irradiating the electromagnetic wave to a monitoring zone comprising the object;
   receiving some of signals of the electromagnetic wave scattered by the object; and
   analyzing the received scattered signal and identifying a position of the object,
   wherein, the irradiating an electromagnetic wave onto the object comprises irradiating the electromagnetic wave onto the object based on the identified position of the object.

6. The depth information generating method of claim 5, wherein the irradiating of the electromagnetic wave onto the object comprises:
   analyzing the received scattered signal to calculate a distance between a position at which the electromagnetic wave is irradiated and a point nearest to the object and a point farthest from the object; and
   irradiating the electromagnetic wave with a varying intensity according to the calculated distance.

7. The depth information generating method of claim 5, wherein the irradiating of the electromagnetic wave onto the object comprises, when a number of the objects is plural, irradiating the electromagnetic wave onto each of the plurality of objects based on the identified positions of the objects.

8. The depth information generating method of claim 1, wherein the electromagnetic wave irradiated onto the object is time and spatial light modulated electromagnetic wave.

9. The depth information generating method of claim 1, wherein the object is a user's hand, and
   further comprising controlling a function of a display device that outputs an image according to a gesture command corresponding to a movement of the user's hand determined from the generated depth map.

10. The depth information generating method of claim 1, wherein the generating of the depth map comprises combining the first depth map and the second depth map using super resolution technique or hybrid imaging technique.

11. The depth information generating method of claim 1, wherein the irradiating of the electromagnetic wave onto the object comprises irradiating onto the object while shifting the electromagnetic wave composed of a plurality of laser beams to a preset direction for irradiating the electromagnetic wave over an entirety of the object.

12. The depth information generating method of claim 1, wherein the irradiating of the electromagnetic wave onto the object comprises irradiating a time light modulated electromagnetic wave onto the object.

13. An optical device for generating a depth map for an object, comprising:
   a projector for irradiating an electromagnetic wave onto the object;
   an optical receiver for receiving the electromagnetic wave reflected from the object; and
   at least one processor configured to:
      generate a first depth map for the object based on a direction of arrival of the electromagnetic wave reflected from the object,
      generate a second depth map for the object based on a time during which the electromagnetic wave travels a round trip path from being reflected against the object until being received, and
      generate a depth map for the object by combining the first depth map and the second depth map.

14. The optical device of claim 13, wherein the at least one processor is further configured to:
   generate the first depth map from a direction of arrival spectrum calculated by performing a correlation operation on a steering vector calculated based on an impulse response of the optical receiver and an output vector of the optical receiver receiving the electromagnetic wave reflected from the object.

15. The optical device of claim 14,
   wherein, the optical receiver comprises a plurality of light receiving elements, and
   wherein the at least one processor is further configured to perform the correlation operation using an equation below:

$$P^l(\theta, \phi) = (\vec{x}(t), \vec{a}(\theta, \phi, t, d_l))_2 = \sum_{m=0}^{M-1} (x_m(t) \cdot a_m(\theta, \phi, t, d_l))_2$$

where, M is a total number of the plurality of light receiving elements, $\vec{x}(t)$ is the output vector, $\vec{a}(t, \theta, \phi, d)$ is the steering vector, $x_m(t)$ is output of an m-th light receiving element, and $a_m(\theta, \varphi, t, d_l)$ is a steering vector component corresponding the m-th light receiving element.

16. The optical device of claim 14, wherein the at least one processor is further configured to:
   calculate a direction of arrival spectrum from which sidelobes have been removed by performing the correlation operation using an equation below, and
   generate the first depth map from the direction of arrival spectrum from which the sidelobes have been removed, $$P^l(\theta, \phi) = \begin{bmatrix} \sum_{m=0}^{M-1} \langle x_m, a_m \rangle, & \text{if } \forall_m \langle x_m, a_m \rangle \neq 0 \\ 0, & \text{otherwise} \end{bmatrix}$$

where, $\langle x_m, a_m \rangle$ is $$\langle x_m, a_m \rangle = \begin{bmatrix} \dfrac{1}{M}, & \text{if } \dfrac{(x_m, a_m)}{\|x_m\| \cdot \|a_m\|} > \varepsilon, \varepsilon \in (0, 1) \\ 0, & \text{otherwise} \end{bmatrix},$$

where, $(x_m, a_m)$ is $$(x_m, a_m) = \int_{\frac{(\vec{k},\vec{r}_m)}{c}}^{\frac{(\vec{k},\vec{r}_m)}{c}+\Delta} x_m(t) \cdot a_m(\theta, \phi, t, d_l) dt$$

where, M is a number of the plurality of light receiving elements, $\vec{k}$ is a wave vector representing the reflected wave incident on the optical receiver, $\vec{r}_m$ is a radius vector representing an m-th light receiving element among the plurality of light receiving elements, $\Delta$ is a wavelength of the electromagnetic wave reflected from the object, and c is the speed of light.

* * * * *